US010528589B2

(12) United States Patent
Jakubiak et al.

(10) Patent No.: US 10,528,589 B2
(45) Date of Patent: Jan. 7, 2020

(54) CROSS VISUALIZATION INTERACTION BETWEEN DATA VISUALIZATIONS

(71) Applicant: Oracle International Corporation, Redwood Shores, CA (US)

(72) Inventors: Matthew Jakubiak, El Granada, CA (US); Bo Jonas Birger Lagerblad, Palo Alto, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 266 days.

(21) Appl. No.: 14/865,249

(22) Filed: Sep. 25, 2015

(65) Prior Publication Data
US 2016/0092530 A1 Mar. 31, 2016

Related U.S. Application Data

(60) Provisional application No. 62/056,410, filed on Sep. 26, 2014, provisional application No. 62/079,363, filed on Nov. 13, 2014.

(51) Int. Cl.
G06F 17/00 (2019.01)
G06F 17/21 (2006.01)
(Continued)

(52) U.S. Cl.
CPC .......... G06F 16/26 (2019.01); G06F 3/04842 (2013.01); G06F 17/211 (2013.01)

(58) Field of Classification Search
CPC .... G06F 17/246; G06F 17/211; G06F 3/0484; G06F 3/04842; G06F 3/048
(Continued)

(56) References Cited

U.S. PATENT DOCUMENTS 9,824,470 B2 * 11/2017 Kuo ...................... G06T 11/206
9,933,928 B2 * 4/2018 Mackinlay .......... G06F 3/04817
(Continued)

FOREIGN PATENT DOCUMENTS

CN 106575308 4/2017
EP 3198487 8/2017
(Continued)

OTHER PUBLICATIONS

Peltier, "Highlighted Chart Source Data." 2008. available at: https://peltiertech.com/highlighted-chart-source-data/.*
(Continued)

Primary Examiner — Ariel Mercado
(74) Attorney, Agent, or Firm — Kilpatrick Townsend & Stockton LLP

(57) ABSTRACT

Some embodiments disclose techniques for enabling cross visualization interaction between data corresponding to different visualizations. In an embodiment, a visual analyzer system is disclosed that is capable of generating and displaying a plurality of visualizations to a user via a graphical user interface. The visual analyzer system is capable of receiving a selection of a particular portion of a visualization from a user and correlating the selected portion with portions of data in other visualizations that are displayed to the user. In some embodiments, the visual analyzer system is capable of highlighting the correlated portions of the data and presenting the highlighted portions via the graphical user interface to a user.

20 Claims, 24 Drawing Sheets

(51) Int. Cl.
*G06F 3/01* (2006.01)
*G06F 16/26* (2019.01)
*G06F 3/0484* (2013.01)

(58) Field of Classification Search
USPC .......................................................... 715/202
See application file for complete search history.

(56) References Cited

U.S. PATENT DOCUMENTS

| | | | |
|---|---|---|---|
| 9,971,742 | B2 | 5/2018 | Lagerblad et al. |
| 2012/0303548 | A1* | 11/2012 | Johnson .................. G06F 17/00 715/810 |
| 2012/0313949 | A1* | 12/2012 | Rope ...................... G06F 17/246 345/440 |
| 2013/0097177 | A1 | 4/2013 | Fan et al. |
| 2014/0108929 | A1 | 4/2014 | Garmark et al. |
| 2015/0278371 | A1 | 10/2015 | Anand et al. |
| 2016/0092408 | A1 | 3/2016 | Lagerblad et al. |

FOREIGN PATENT DOCUMENTS

| | | |
|---|---|---|
| JP | 0476679 | 3/1992 |
| JP | 07302347 | 11/1995 |
| JP | 2009508210 | 2/2009 |
| JP | 2011113564 | 6/2011 |
| JP | 2014056573 | 3/2014 |
| WO | 2013049084 | 4/2013 |
| WO | 2016049634 | 3/2016 |

OTHER PUBLICATIONS

Tibco Software Inc, New Release Boosts Ease of Use Across the Entire Spotfire Platform, Available online at: http://spotfire.tibco.com, Apr. 14, 2016, 3 pages.
U.S. Appl. No. 14/866,272, Applicant Initiated Interview Summary dated Oct. 5, 2017, 3 pages.
U.S. Appl. No. 14/866,272, Non-Final Office Action dated Jul. 13, 2017, 17 pages.
International Application No. PCT/US2015/052661, International Preliminary Report on Patentability dated Jan. 11, 2017, 8 pages.
International Application No. PCT/US2015/052661, International Search Report and Written Opinion dated Feb. 4, 2016, 11 pages.
International Application No. PCT/US2015/052661, Written Opinion dated Sep. 27, 2016, 7 pages.
Japanese Application No. 2017-515145, Office Action dated Mar. 12, 2019, 6 pages (5 pages for the original document and 1 page for the English translation).

* cited by examiner

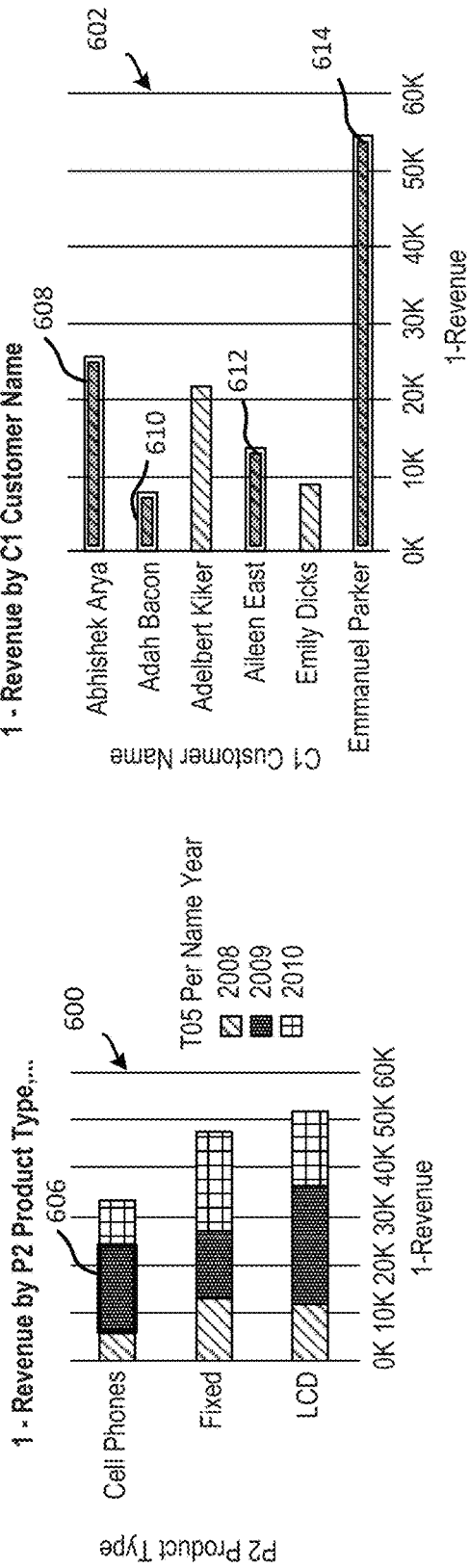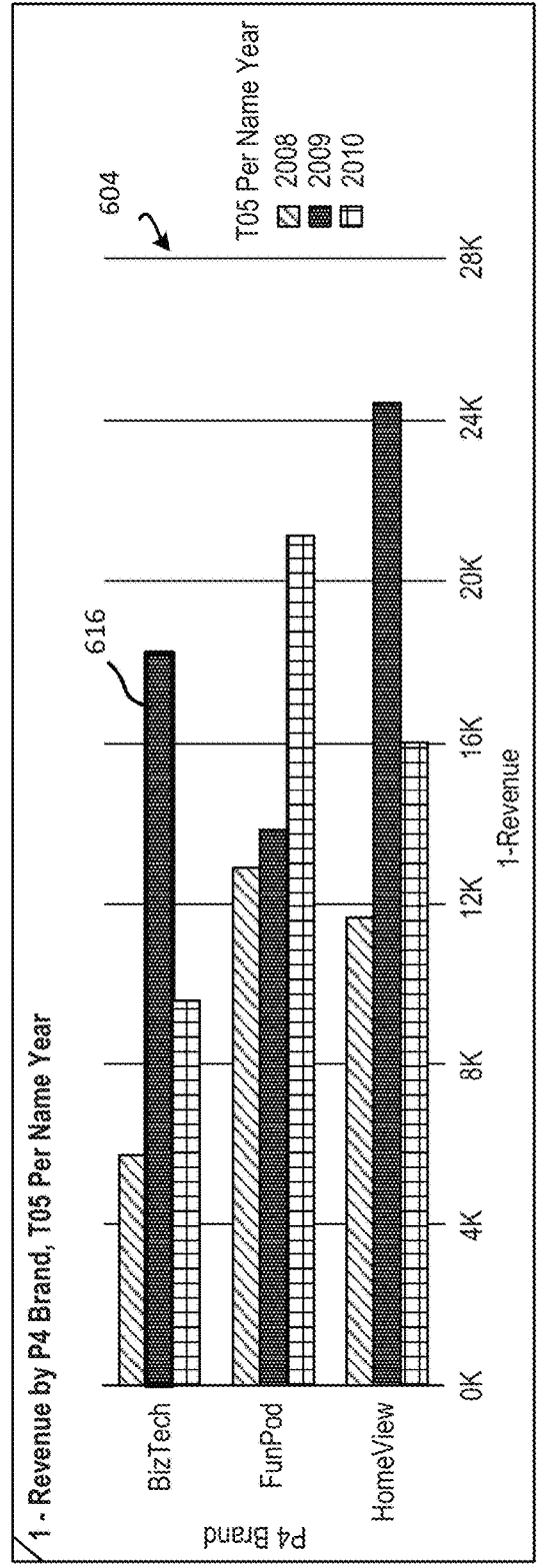
FIG. 6

| Abhishek A | 1306.12 | Cell Phone | BizTech | 2008 |
|---|---|---|---|---|
| Abhishek A | 4511.06 | Cell Phone | BizTech | 2009 |
| Abhishek A | 7752.83 | Fixed | FunPod | 2008 |
| Abhishek A | 2539.01 | Fixed | FunPod | 2009 |
| Abhishek A | 4401.32 | LCD | HomeView | 2008 |
| Abhishek A | 4970.01 | LCD | HomeView | 2009 |
| Abhishek A | 538.00 | LCD | HomeView | 2010 |
| Adah Bacon | 2077.15 | Cell Phone | BizTech | 2009 |
| Adah Bacon | 3270.95 | LCD | HomeView | 2009 |
| Adah Bacon | 2870.04 | LCD | HomeView | 2010 |
| Adelbert K | 2754.60 | Fixed | FunPod | 2008 |
| Adelbert K | 5918.07 | Fixed | FunPod | 2009 |
| Adelbert K | 1400.02 | Fixed | FunPod | 2010 |
| Adelbert K | 1407.56 | LCD | HomeView | 2008 |
| Adelbert K | 4215.24 | LCD | HomeView | 2009 |
| Adelbert K | 6211.30 | LCD | HomeView | 2010 |
| Aileen Eas | 2291.12 | Cell Phone | BizTech | 2008 |
| Aileen Eas | 3453.69 | Cell Phone | BizTech | 2009 |
| Aileen Eas | 4084.73 | Cell Phone | BizTech | 2010 |
| Aileen Eas | 4107.02 | Fixed | FunPod | 2010 |
| Emily Dick | 2371.99 | Fixed | FunPod | 2009 |
| Emily Dick | 4458.08 | Fixed | FunPod | 2010 |
| Emily Dick | 2207.12 | LCD | HomeView | 2010 |
| Emmanuel P | 2201.20 | Cell Phone | BizTech | 2008 |
| Emmanuel P | 8250.86 | Cell Phone | BizTech | 2009 |
| Emmanuel P | 5523.30 | Cell Phone | BizTech | 2010 |
| Emmanuel P | 2409.57 | Fixed | FunPod | 2008 |
| Emmanuel P | 3033.83 | Fixed | FunPod | 2009 |
| Emmanuel P | 11230.75 | Fixed | FunPod | 2010 |
| Emmanuel P | 5922.92 | LCD | HomeView | 2008 |
| Emmanuel P | 12013.94 | LCD | HomeView | 2009 |
| Emmanuel P | 4209.64 | LCD | HomeView | 2010 |

FIG. 7

| - Abhishek A | - 1306.12 | - Cell Phone | - BizTech | - 2008 |
| --- | --- | --- | --- | --- |
| - Abhishek A | - 4511.06 | X Cell Phone | - BizTech | X 2009 |
| - Abhishek A | - 7752.83 | - Fixed | - FunPod | - 2008 |
| - Abhishek A | - 2539.01 | - Fixed | - FunPod | - 2009 |
| - Abhishek A | - 4401.32 | - LCD | - HomeView | - 2008 |
| - Abhishek A | - 4970.01 | - LCD | - HomeView | - 2009 |
| - Abhishek A | - 538.00 | - LCD | - HomeView | - 2010 |
| - Adah Bacon | - 2077.15 | X Cell Phone | - BizTech | X 2009 |
| - Adah Bacon | - 3270.95 | - LCD | - HomeView | - 2009 |
| - Adah Bacon | - 2870.04 | - LCD | - HomeView | - 2010 |
| - Adelbert K | - 2754.60 | - Fixed | - FunPod | - 2008 |
| - Adelbert K | - 5918.07 | - Fixed | - FunPod | - 2009 |
| - Adelbert K | - 1400.02 | - Fixed | - FunPod | - 2010 |
| - Adelbert K | - 1407.56 | - LCD | - HomeView | - 2008 |
| - Adelbert K | - 4215.24 | - LCD | - HomeView | - 2009 |
| - Adelbert K | - 6211.30 | - LCD | - HomeView | - 2010 |
| - Aileen Eas | - 2291.12 | - Cell Phone | - BizTech | - 2008 |
| - Aileen Eas | - 3453.69 | X Cell Phone | - BizTech | X 2009 |
| - Aileen Eas | - 4084.73 | - Cell Phone | - BizTech | - 2010 |
| - Aileen Eas | - 4107.02 | - Fixed | - FunPod | - 2010 |
| - Emily Dick | - 2371.99 | - Fixed | - FunPod | - 2009 |
| - Emily Dick | - 4458.08 | - Fixed | - FunPod | - 2010 |
| - Emily Dick | - 2207.12 | - LCD | - HomeView | - 2010 |
| - Emmanuel P | - 2201.20 | - Cell Phone | - BizTech | - 2008 |
| - Emmanuel P | - 8250.86 | X Cell Phone | - BizTech | X 2009 |
| - Emmanuel P | - 5523.30 | - Cell Phone | - BizTech | - 2010 |
| - Emmanuel P | - 2409.57 | - Fixed | - FunPod | - 2008 |
| - Emmanuel P | - 3033.83 | - Fixed | - FunPod | - 2009 |
| - Emmanuel P | - 11230.75 | - Fixed | - FunPod | - 2010 |
| - Emmanuel P | - 5922.92 | - LCD | - HomeView | - 2008 |
| - Emmanuel P | - 12013.94 | - LCD | - HomeView | - 2009 |
| - Emmanuel P | - 4209.64 | - LCD | - HomeView | - 2010 |

800

X = Item is marked
- = Item is not marked

FIG. 8

Edge 1 (14 rows):

| | | |
|---|---|---|
| - Abhishek A | - 5817.18 | - Cell Phone |
| - Abhishek A | - 10291.84 | - Fixed |
| - Abhishek A | - 9909.33 | - LCD |
| - Adah Bacon | - 2077.15 | - Cell Phone |
| - Adah Bacon | - 6140.99 | - LCD |
| - Adelbert K | - 10072.69 | - Fixed |
| - Adelbert K | - 11834.10 | - LCD |
| - Aileen Eas | - 9829.54 | - Cell Phone |
| - Aileen Eas | - 4107.02 | - Fixed |
| - Emily Dick | - 6830.07 | - Fixed |
| - Emily Dick | - 2207.12 | - LCD |
| - Emmanuel P | - 15975.36 | - Cell Phone |
| - Emmanuel P | - 16674.15 | - Fixed |
| - Emmanuel P | - 22146.50 | - LCD |

Edge 1 (32 rows):

| | | | |
|---|---|---|---|
| - Abhishek A | - 1306.12 | - Cell Phone | - 2008 |
| - Abhishek A | - 4511.06 | - Cell Phone | - 2009 |
| - Abhishek A | - 7752.83 | - Fixed | - 2008 |
| - Abhishek A | - 2539.01 | - Fixed | - 2009 |
| - Abhishek A | - 4401.32 | - LCD | - 2008 |
| - Abhishek A | - 4970.01 | - LCD | - 2009 |
| - Abhishek A | - 538.00 | - LCD | - 2010 |
| - Adah Bacon | - 2077.15 | - Cell Phone | - 2009 |
| - Adah Bacon | - 3270.95 | - LCD | - 2009 |
| - Adah Bacon | - 2870.04 | - LCD | - 2010 |
| - Adelbert K | - 2754.60 | - Fixed | - 2008 |
| - Adelbert K | - 5918.07 | - Fixed | - 2009 |
| - Adelbert K | - 1400.02 | - Fixed | - 2010 |
| - Adelbert K | - 1407.56 | - LCD | - 2008 |
| - Adelbert K | - 4215.24 | - LCD | - 2009 |
| - Adelbert K | - 6211.30 | - LCD | - 2010 |
| - Aileen Eas | - 2291.12 | - Cell Phone | - 2008 |
| - Aileen Eas | - 3453.69 | - Cell Phone | - 2009 |
| - Aileen Eas | - 4084.73 | - Cell Phone | - 2010 |
| - Aileen Eas | - 4107.02 | - Fixed | - 2010 |
| - Emily Dick | - 2371.99 | - Fixed | - 2009 |
| - Emily Dick | - 4458.08 | - Fixed | - 2010 |
| - Emily Dick | - 2207.12 | - LCD | - 2010 |
| - Emmanuel P | - 2201.20 | - Cell Phone | - 2008 |
| - Emmanuel P | - 8250.86 | - Cell Phone | - 2009 |
| - Emmanuel P | - 5523.30 | - Cell Phone | - 2010 |
| - Emmanuel P | - 2409.57 | - Fixed | - 2008 |
| - Emmanuel P | - 3033.83 | - Fixed | - 2009 |
| - Emmanuel P | - 11230.75 | - Fixed | - 2010 |
| - Emmanuel P | - 5922.92 | - LCD | - 2008 |
| - Emmanuel P | - 12013.94 | - LCD | - 2009 |
| - Emmanuel P | - 4209.64 | - LCD | - 2010 |

FIG. 12B

Step 7 – Add Brand
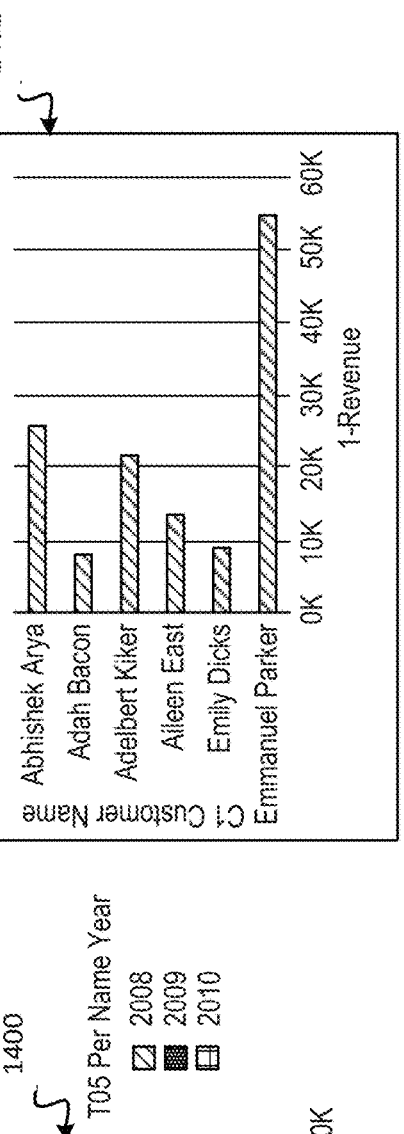
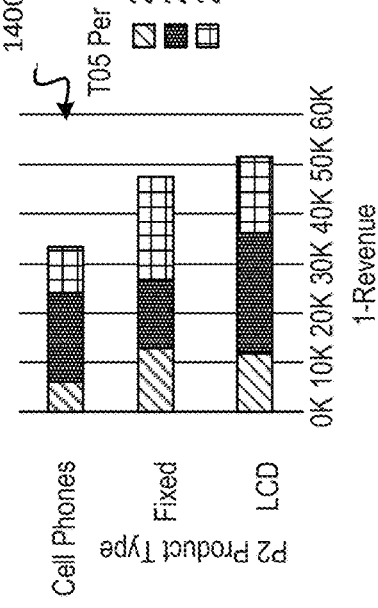
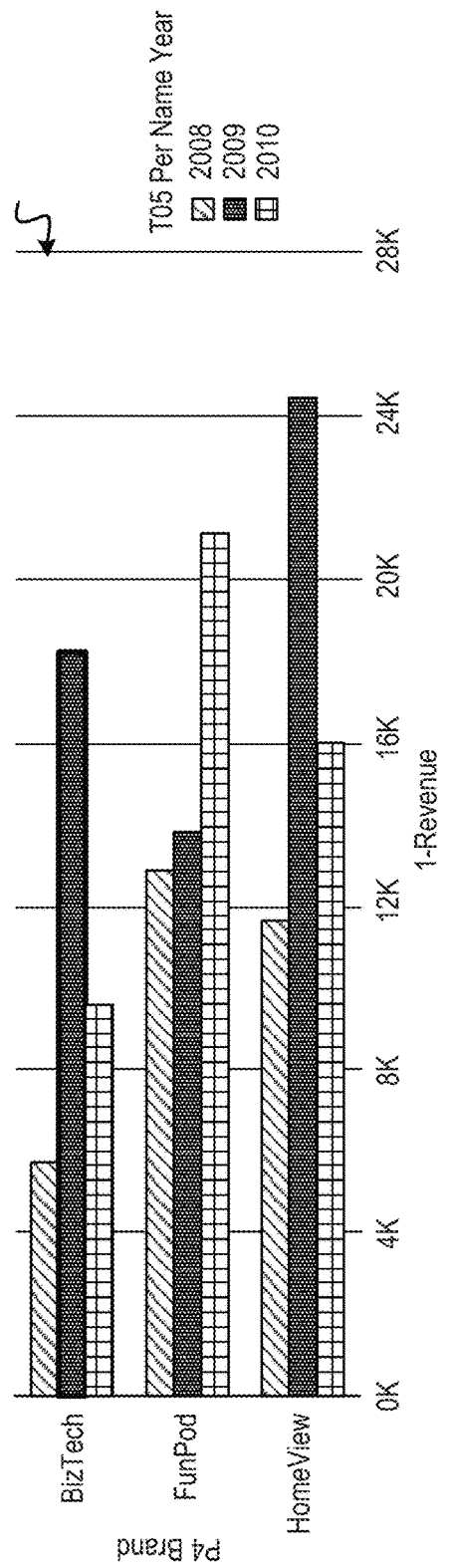
FIG. 14A

Edge 1 (32 rows): 1406

| | | | | |
|---|---|---|---|---|
| - Abhishek A | - 1306.12 | - Cell Phone | - 2008 | - BizTech |
| - Abhishek A | - 4511.06 | - Cell Phone | - 2009 | - BizTech |
| - Abhishek A | - 7752.83 | - Fixed | - 2008 | - FunPod |
| - Abhishek A | - 2539.01 | - Fixed | - 2009 | - FunPod |
| - Abhishek A | - 4401.32 | - LCD | - 2008 | - HomeView |
| - Abhishek A | - 4970.01 | - LCD | - 2009 | - HomeView |
| - Abhishek A | - 538.00 | - LCD | - 2010 | - HomeView |
| - Adah Bacon | - 2077.15 | - Cell Phone | - 2009 | - BizTech |
| - Adah Bacon | - 3270.95 | - LCD | - 2009 | - HomeView |
| - Adah Bacon | - 2870.04 | - LCD | - 2010 | - HomeView |
| - Adelbert K | - 2754.60 | - Fixed | - 2008 | - FunPod |
| - Adelbert K | - 5918.07 | - Fixed | - 2009 | - FunPod |
| - Adelbert K | - 1400.02 | - Fixed | - 2010 | - FunPod |
| - Adelbert K | - 1407.56 | - LCD | - 2008 | - HomeView |
| - Adelbert K | - 4215.24 | - LCD | - 2009 | - HomeView |
| - Adelbert K | - 6211.30 | - LCD | - 2010 | - HomeView |
| - Aileen Eas | - 2291.12 | - Cell Phone | - 2008 | - BizTech |
| - Aileen Eas | - 3453.69 | - Cell Phone | - 2009 | - BizTech |
| - Aileen Eas | - 4084.73 | - Cell Phone | - 2010 | - BizTech |
| - Aileen Eas | - 4107.02 | - Fixed | - 2010 | - FunPod |
| - Emily Dick | - 2371.99 | - Fixed | - 2009 | - FunPod |
| - Emily Dick | - 4458.08 | - Fixed | - 2010 | - FunPod |
| - Emily Dick | - 2207.12 | - LCD | - 2010 | - HomeView |
| - Emmanuel P | - 2201.20 | - Cell Phone | - 2008 | - BizTech |
| - Emmanuel P | - 8250.86 | - Cell Phone | - 2009 | - BizTech |
| - Emmanuel P | - 5523.30 | - Cell Phone | - 2010 | - BizTech |
| - Emmanuel P | - 2409.57 | - Fixed | - 2008 | - FunPod |
| - Emmanuel P | - 3033.83 | - Fixed | - 2009 | - FunPod |
| - Emmanuel P | - 11230.75 | - Fixed | - 2010 | - FunPod |
| - Emmanuel P | - 5922.92 | - LCD | - 2008 | - HomeView |
| - Emmanuel P | - 12013.94 | - LCD | - 2009 | - HomeView |
| - Emmanuel P | - 4209.64 | - LCD | - 2010 | - HomeView |

Table 1802:

| | | |
|---|---|---|
| 2468.44 | CompCell R | 2010 |
| 1271.65 | CompCell R | 2011 |
| 4799.02 | CompCell R. | 2012 |
| 1139.72 | GameStati | 2011 |
| 2176.46 | HomeCoach | 2010 |
| 2498.87 | HomeCoach | 2011 |

Table 1804:

| | | |
|---|---|---|
| 2497.08 | CompCell R | Aldercy Sp |
| 4203.45 | CompCell R | Andrea Gos |
| 1838.58 | CompCell R | Jim Hanson |
| 1139.72 | Game Stati | Adah Bacon |
| 4675.33 | HomeCoach | Jam Hanson |

Table 1806:

| | | |
|---|---|---|
| 1139.72 | Adah Bacon | 2011 |
| 1271.65 | Aldercy Sp | 2011 |
| 1225.43 | Aldercy Sp | 2012 |
| 1771.47 | Andrea Gos | 2010 |
| 2431.98 | Andrea Gos | 2012 |
| 2873.43 | Jim Hanson | 2010 |
| 2498.87 | Jim Hanson | 2011 |
| 1141.61 | Jim Hanson | 2012 |

CROSS VISUALIZATION INTERACTION BETWEEN DATA VISUALIZATIONS

CROSS-REFERENCES TO RELATED APPLICATIONS

The present application claims the benefit of U.S. Provisional Application No. 62/056,410, filed on Sep. 26, 2014, titled "DATA INTERACTION BASED ON GRAIN OPTIMIZED TRANSLATION TABLE," and U.S. Provisional Application No. 62/079,363, filed on Nov. 13, 2014, titled "VISUAL ANALYZER SYSTEM," both of which are herein incorporated by reference in their entirety for all purposes.

BACKGROUND OF THE INVENTION

Visual representations of data can make understanding large and/or complicated data sets much easier for a person. Different types of data lends itself to representation in different forms. Further, depending on the situation, a certain customized data layout, such as a specific layout arrangement for an organizational chart, may be desired for visualizing data. As such, an increase in the ability to customize data visualizations may benefit users.

BRIEF SUMMARY OF THE INVENTION

In certain embodiments, techniques are provided (e.g., a method, a system, non-transitory computer-readable medium storing code or instructions executable by one or more processors) for enabling cross visualization interaction between data corresponding to different visualizations. A visualization as described herein corresponds to a visual representation of data. In one embodiment, a visualization may include graphic elements or shaped and/or text elements. For example, a visualization may include a table, a bar chart, a line chart, a combination chart, a pie chart, a scatterplot, a map chart, a treemap, a heat map, a parallel coordinate plot, a summary table, a box plot, a text area, a user created or a customizable chart.

In some embodiments, a visual analyzer system is disclosed that is capable of generating and displaying a plurality of visualizations to a user via a graphical user interface. In an embodiment, the visual analyzer system is capable of receiving a selection of a particular portion of a visualization from a user and correlating the selected portion with portions of data in other visualizations that are displayed to the user. In some embodiments, the visual analyzer system is capable of highlighting the correlated portions of the data and presenting the highlighted portions via the graphical user interface to a user.

In certain embodiments, the disclosed techniques include displaying a first visualization and displaying a second visualization. The first visualization comprises a visual representation of first data and the second visualization comprises a visual representation of second data. The techniques include receiving input indicative of selection of a first portion of the visual representation of the first data in the first visualization and determining, corresponding to the selected first portion, a first dimension member belonging to a first dimension of the first visualization. In some embodiments, the techniques further include determining a second dimension member that is correlated to the first dimension member and highlighting a first portion of the second visualization corresponding to the second dimension member. In some examples, the second dimension member belongs to a second dimension that is different from the first dimension of the first dimension member.

In some embodiments, the techniques include, prior to displaying the first visualization, receiving a request to create the first visualization. In some examples, the request includes at least the first dimension of the first visualization. The techniques include obtaining first data corresponding to the first visualization in response to the request and generating the first visualization based at least in part on the obtained first data. In some examples, the visual representation of the first data in the first visualization or the visual representation of the second data in the second visualization comprises at least one of a table, a bar chart, a line chart, a combination chart, a pie chart, a scatterplot, a map chart, a treemap, a heat map, a parallel coordinate plot, a summary table, a box plot, a text area, a user created or a customizable chart.

In some embodiments, the techniques include constructing a correlation table. In some examples, the correlation table comprises at least the first data corresponding to the first visualization. In certain embodiments, the techniques for determining a second dimension member that is correlated to the first dimension member include identifying a correlation table from a set of one or more correlation tables that comprises at least the first dimension member of the first visualization, marking a set of one or more rows of the correlation table that include at least the first dimension member and determining the second dimension that is correlated to the first dimension member based at least in part on the market set of one or more rows.

In certain embodiments, the techniques for highlighting the first portion of the second visualization corresponding to the second dimension member include identifying a set of one or more visualization tables corresponding to one or more visualizations that include at least the first dimension member and the second dimension member, marking a set of one or more rows of the identified set of one or more visualization tables that include at least the first dimension member and the second dimension member and identifying one or more portions of the one or more visualizations that correspond to the marked set of one or more rows. In an example, the one or more visualizations include at least the second visualization. In an example, the identified one or more portions include at least the first portion of the second visualization.

In some embodiments, the techniques include receiving input indicative of more than one portion of the visual representation of the first data in the first visualization. In some embodiments, the techniques include displaying a third visualization, wherein the third visualization comprises a visual representation of third data. The techniques include, prior to displaying the third visualization, receiving a request to create the third visualization, obtaining third data corresponding to the third visualization in response to the request and generating the third visualization based at least in part on the obtained third data.

In some embodiments, the techniques include constructing at least a first correlation table and a second correlation table. The first correlation table may include at least the first data corresponding to the first visualization and the second data corresponding to the second visualization. In some examples, the second correlation table may include at least one of the first data corresponding to the first visualization and the third data corresponding to the third visualization. In other examples, the second correlation table may include the second data corresponding to the second visualization and the third data corresponding to the third visualization. In some examples, the second correlation table or the third correlation table may be constructed in response to receiving a request to create the second visualization or the third visualization.

In certain embodiments, the techniques include displaying the first visualization, the second visualization and the highlighted first portion of the second visualization via a graphical user interface of a client device.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 is a graphical illustration of a plurality of visualizations displayed on a GUI of a client device, in accordance with an embodiment of the present invention.

FIG. 7 is an exemplary illustration of a correlation table corresponding to a set of one or more visualizations, in accordance with an embodiment of the present invention.

FIG. 8 is an illustration of a correlation table in which the rows of the correlation table that identify dimension members of a selected portion of a visualization are marked, in accordance with an embodiment of the present invention.

FIG. 12B is an exemplary illustration of an updated correlation table that is generated based on the addition of a new dimension to a visualization, by a user.

FIG. 14A is an exemplary illustration of the addition of a new dimension to the data represented by a visualization by a user, in accordance with an embodiment of the present invention.

FIG. 14B is an exemplary illustration of an updated correlation table that is generated based on the addition of a new dimension to a visualization, by a user.

FIG. 18 is an exemplary illustration of multiple correlation tables corresponding to a set of one or more visualizations, in accordance with an embodiment of the present invention.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Embodiments of the present invention provide techniques for generating and displaying a plurality of visualizations to a user via a graphical user interface. In some embodiments, a visual analyzer system is disclosed that is capable of receiving a selection of one or more portions of a visualization from a user and correlating the selected portions with portions of data in other visualizations that are displayed to the user. In some embodiments, the visual analyzer system is capable of highlighting the correlated portions of the data and presenting the highlighted portions via the graphical user interface to a user.

Figure 1:
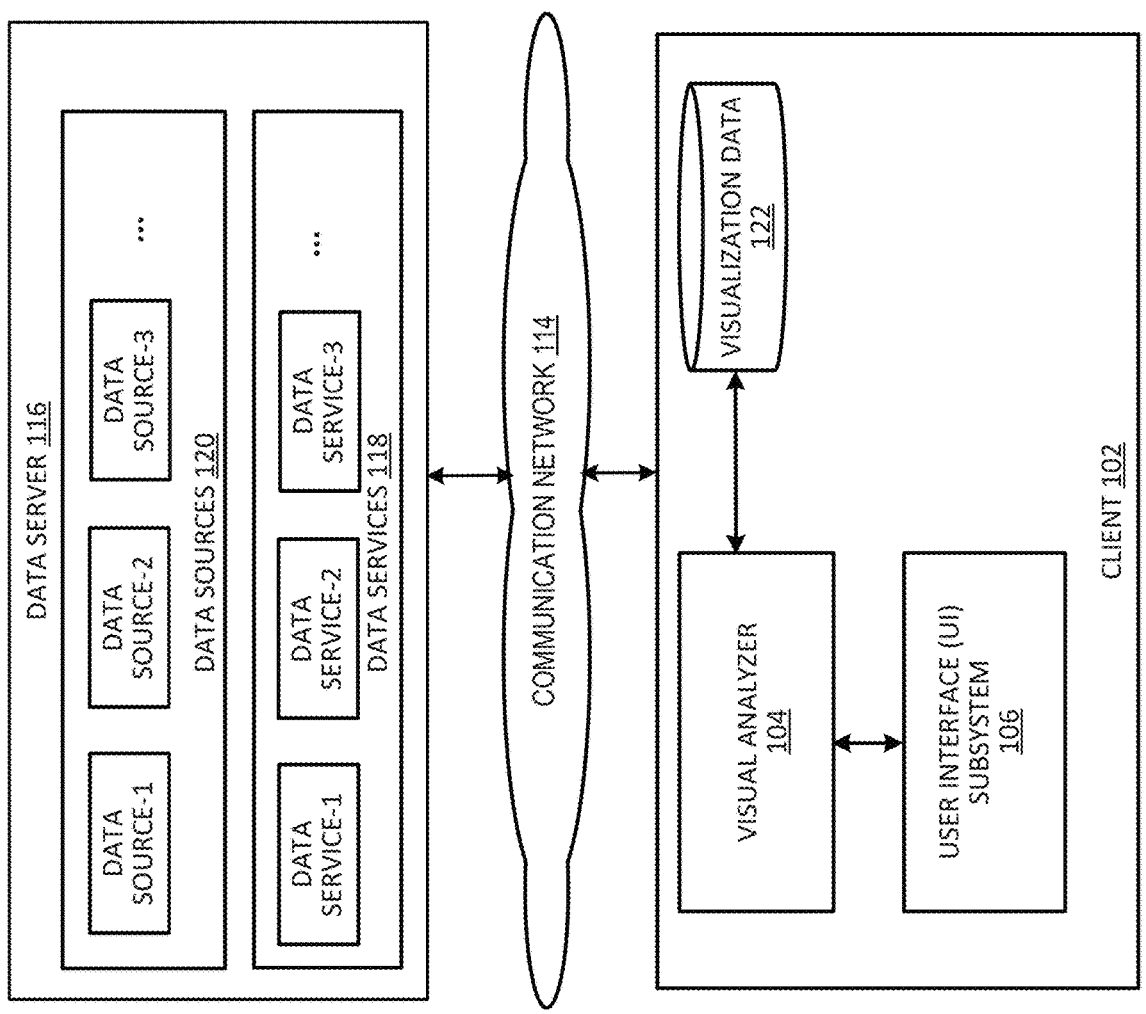
FIG. 1 illustrates an example block diagram of a computing environment in accordance with certain embodiments of the present invention.

FIG. 1 illustrates an example block diagram of a computing environment 100 in accordance with certain embodiments of the present invention. As shown, computing environment 100 includes a client 102 communicatively coupled to a data server 116 via a communication network 114. The embodiment depicted in FIG. 1 is merely an example and is not intended to unduly limit the claimed embodiments of the present invention. One of ordinary skill in the art would recognize many variations, alternatives, and modifications.

Client 102 may include client devices, which may be of various different types, including, but not limited to, a personal computer, a desktop, a mobile or handheld device such as a laptop, a mobile phone, a tablet, etc., and other types of devices. Client 102 may also include programs or applications executing on client devices. For example, a client 102 may be a web browser, a proprietary client application, or some other application executing on the client device.

Communication network 114 facilitates communications between one or more client devices such as client device 102 and data server 116. Communication network 114 can be of various types and can include one or more communication networks. For example, communication network 114 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 114 may include any communication network or infrastructure that facilitates communications between one or more client devices such as client device 104 and data server 116.

In certain embodiments, client 102 may include a visual analyzer system 104 and a user interface (UI) subsystem 106. In some embodiments, visual analyzer system 104 can generate one or more visualizations and present the visualizations to a user of client 102 via a graphical user interface (GUI) on client 102. For instance, visual analyzer system 104 may provide the generated visualizations to a user interface (UI) subsystem 106 that may cause the visualizations to be displayed on the GUI of client 102 (e.g., via a browser application). As noted above, visualizations are representations of some data. In one embodiment, a visualization can display graphic elements, shapes and/or text elements. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc.

In certain embodiments, visual analyzer system 104 may generate a visualization with multiple graphical attributes (also referred to as edges) that each correspond to a specified dimension. For example, visual analyzer system 104 can generate a bar chart with color, axis, size attributes and the like that each correspond to a dimension specified by a user such as time, sales, and other entities. Each dimension may also have one or more dimension members, such as years 2009, 2010, 2011, company names X, Y, Z, different types of products, and the like.

Each visualization can include values for multiple dimensions of data from one or more columns in a database, in some embodiments. A database can be a relational database that includes one or more tables. A table can have a set of rows and a set of columns. A dimension can correspond to a column of a table (or a database) while a record can correspond to a row of a table (or a database). In some embodiments, visual analyzer system 104 may interact with UI subsystem 106 to provide a projection of one or more databases to user of client 102 (e.g., via a browser application on the client). The user can identify one or more dimensions of data available in the one or more databases and request the visual analyzer system to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include rows (also referred to as x-axis), columns (also referred to as y-axis), categories, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more logical edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc. The logical edges are used to generate a data model that contain physical edges: rows, columns, and data.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization, although one physical edge is always required in order to render and mark a data visualization.

In certain embodiments, visual analyzer system 104 can generate one or more visualizations based on one or more dimensions of data specified by a user. For example, the user may specify multiple dimensions such as time, sales, and entities to be represented by a visualization. Visual analyzer system 104 may then generate a visualization with multiple edges (also referred to as graphical attributes) that each correspond to a specified dimension. For example, visual analyzer system 104 can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

Based on the one or more dimensions of data specified by the user, visual analyzer system 104 can obtain data corresponding to the visualization from data server 116 and generate a visual representation for the user. The visual representation may then be rendered on a GUI of client 102. In certain embodiments, visual analyzer system 104 can generate multiple data visualizations and cause those data visualizations to be displayed on a dashboard of the GUI. After one or more visualizations have been generated and presented on client 102, the user can perform one or more operations on the generated visualizations. For instance, the user may select a portion of the visualization which may cause a different portion of another visualization to be highlighted.

In certain embodiments, data server 116 is capable of obtaining data related to the visualizations for client 102. For instance, client 102 can access one or more data services 118 provided by data server 116 through communication network 114. Data services 118 can in turn contact one or more external data sources 120 to obtain the visualization data for the client. Data sources 120 may include, for instance, visualization data maintained by various enterprises, remote content maintained at one or more remote locations (e.g., the Internet), cloud services content maintained by cloud storage service providers, and the like. Data services 118 can include various software applications that provide visualization data services for client devices such as client 102. In some embodiments, the client devices can access data server 116 through a thin client or web browser executing on each client device. Such software as a service (SaaS) models allow multiple different clients (e.g., clients corresponding to different customer entities) to receive services provided by the software applications without installing, hosting, and maintaining the software themselves on the client device.

As noted above, visual analyzer system 104 can generate multiple data visualizations and cause those data visualizations to be displayed on client devices such as client 102. In an embodiment, data related to the visualizations can be stored in data store 122. In certain embodiments, visual analyzer system 104 can perform additional operations such as receiving input indicative of selection of a portion of a first visualization and highlighting a portion of a second visualization based on the selected portion. Additional details of the operations performed by visual analyzer system 104 are discussed in detail in relation to FIG. 2.

Figure 2:
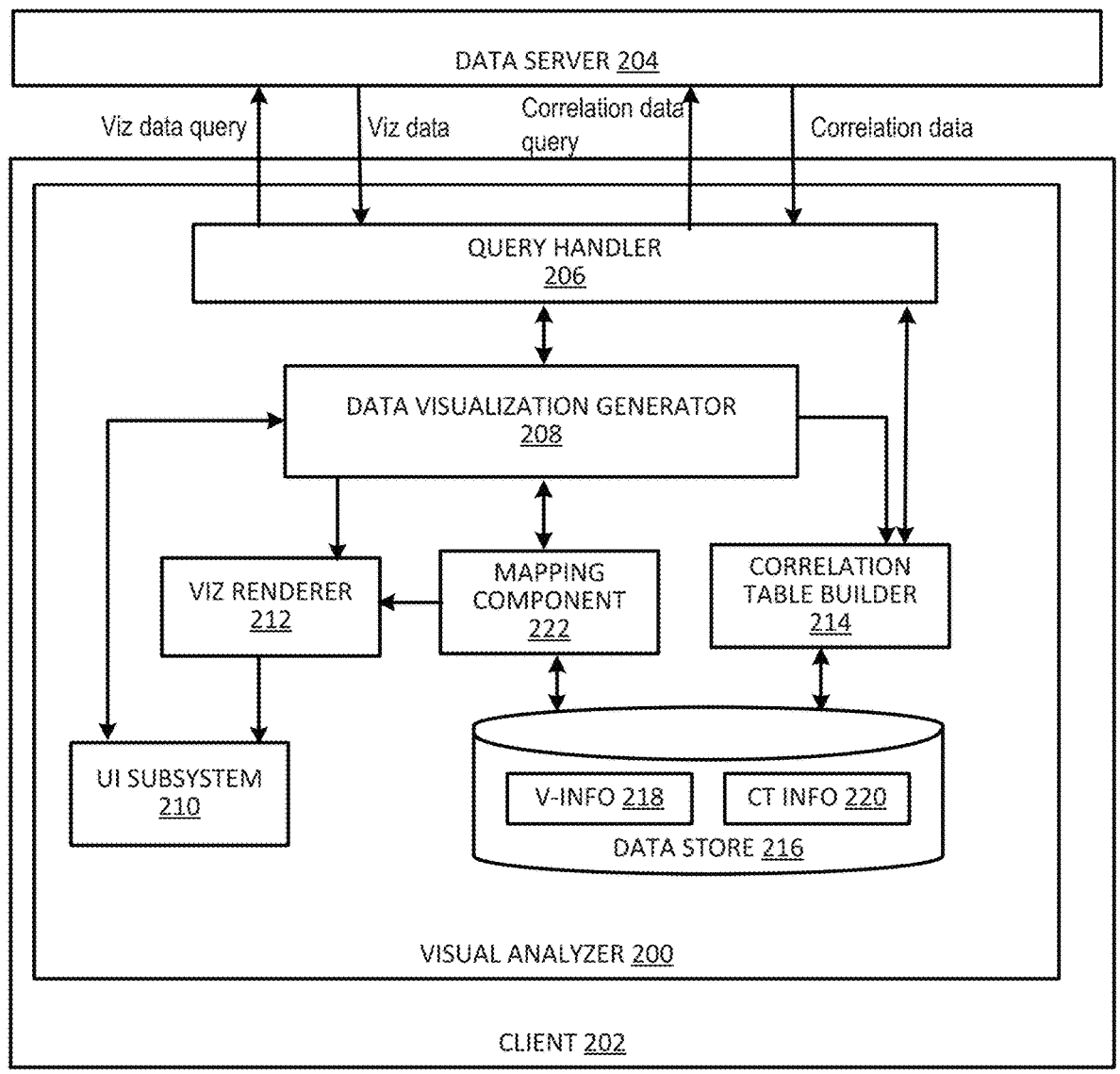
FIG. 2 illustrates a more detailed block diagram of a visual analyzer, according to some embodiments.

FIG. 2 illustrates a more detailed block diagram of a visual analyzer 200, according to some embodiments. Visual analyzer 200 can be implemented as a data processing system in client 202 and may include a data visualization generator 208, a User Interface (UI) subsystem 210, a visualization renderer 212, a correlation table builder 214, data store 216 and a mapping component 222. The components of visual analyzer 200 shown in FIG. 2 are not intended to be limiting. For example, in other embodiments, visual analyzer 200 may include different, more or fewer components. These components may be implemented in hardware, software or a combination thereof. In certain embodiments, visual analyzer 200 may be configured to facilitate cross visualization interaction in between data visualizations that represent different queries of related data sets. The operations performed by visual analyzer 200 are discussed in detail below.

I. Generation of Visualizations

In accordance with certain embodiments, data visualization generator 208 is capable of generating one or more visualizations for a user on client 202. Client 202 may be the same or similar as client 102 described in FIG. 1. As noted above, visualizations may include visual representations of data that are generated based on dimensions of data identified by a user of client 202. For example, a user can request to create a visualization that depicts the revenue generated by the sales of different types of products during a period of time (e.g., 2008-2010) by specifying one or more dimensions such as revenue, product type and years via a GUI on client 202. The dimensions of data may be received by UI subsystem 210 which may then provide the data to data visualization generator 208.

Upon receiving the user's selection of the one or more dimensions of data, data visualization generator 208 may obtain the requested visualization data from data server 204. Data server 204 may be the same or similar as data server 116 described in FIG. 1. In some embodiments, data visualization generator 208 may transmit a query to query handler 206 to obtain the requested data. Query handler 206 may then transmit the query to data server 204. Data server 204 may contact one or more appropriate data sources (e.g., 118) via one or more data services (e.g., 118) to obtain the requested visualization data and provide the requested data to query handler 206. Query handler 206 may then transmit the visualization data to data visualization generator 208. Based on the obtained visualization data, data visualization generator 208 may generate a visualization that is a visual representation of data of the one or more dimensions specified by the user. In some embodiments, data visualization generator 208 may transmit the generated visualization to visualization renderer 212 which may then render the visualization prior to transmitting the visualization to UI subsystem 210. For instance, the visualization renderer 212 may render the visualization as a bar chart with color, axis, size and edges that each correspond to a dimension specified by a user such as, for example, product type, time and revenue. UI subsystem 210 may then display the visualization via GUI in client 202. The process of generating visualizations by data visualization generator 208 discussed above may be performed for any number of visualizations, in certain embodiments.

In some embodiments, the visualizations generated by data visualization generator 208 may be stored in data store 216. For instance, visualization data may be stored in a visualization information (V-info) data store 218. As noted above, in one embodiment, visualization data corresponding to the visualizations may be stored as one or more database tables, wherein the rows and columns of the tables correspond to multiple dimension members of the dimensions associated with the visualizations. In one embodiment, visualization data corresponding to each visualization may be stored in a separate visualization table.

II. Generation of Correlation Tables

In accordance with some embodiments, visual analyzer 200 may include a correlation table builder 214. Correlation table builder 214 is capable of correlating a selected portion of data in one visualization with portions of data in other visualizations that are displayed to the user. In some embodiments, when a visualization is being generated (e.g., by data visualization generator 208), correlation table builder 214 can construct one or more correlation tables incrementally as the user adds dimensions of data to the visualization and/or as the user adds more visualizations to the system. In an embodiment, adding any column to a visualization can create a visualization and the initial correlation table. Thus, in some embodiments, correlation tables are constructed based on data used to generate the visualizations and provide relationships between the one or more dimensions of the visualization data stored in V-info data store 218.

In some embodiments, correlation table builder 214 can transmit a query to query handler 206 to obtain correlation data related to a visualization. Query handler 206 can then transmit the query to data server 204. Data server 204 may contact one or more appropriate data sources (e.g., 120) to obtain the requested correlation data and provide the correlation data to query handler 206. Query handler 206 may then provide the correlation data to correlation table builder 214. Correlation table builder 214 can construct one or more correlation tables based on the obtained correlation data. In some embodiments, the correlation data may be stored in one or more correlation tables in correlation table (CT) information data store 220.

In an embodiment, when a user wishes to add a column (another dimension) to a visualization or create a new visualization (with one or more dimensions), correlation table builder 214 may determine if the new dimension can be added to an existing correlation table stored in CT information data store 220. If the new dimension can be added to an existing correlation table, then correlation table builder 214 updates the existing correlation table with the newly added dimension and its dimension members. Correlation table builder 214 may, in some instances, transmit a query to query handler 206 to obtain correlation data associated with the new dimension and augment the existing correlation table with the correlation data.

If correlation table builder 214 determines that the dimension and/or visualization (with one or more dimensions) specified by the user cannot be added to an existing correlation table, then, in some instances, correlation table builder 214 may create a new correlation table. For example, correlation table builder 214 may transmit a query to query handler 206 to obtain correlation data associated with the new dimension and/or new visualization and create a new correlation table based on the obtained data. The determination of whether a dimension and/or a visualization specified by the user can be augmented into an existing correlation table may be determined based on a variety of factors. For instance, correlation table builder 214 may determine that data related to a dimension and/or visualization specified by the user can be added to an existing correlation table based on the number of dimensions in each of the visualization tables corresponding to the visualizations that are common (overlap with each other). The threshold number of common dimensions that correlation table builder 214 may use to determine whether to add a dimension to an existing correlation table or whether to create a new correlation table may be pre-determined by the system, in some embodiments, or be manually determined by an administrator of the system, in other embodiments.

For instance, if a first visualization specifies 3 dimensions (years, revenue and product type) and a second visualization specifies 2 dimensions (customer name and revenue), then, correlation table builder 214 may augment an existing correlation table (e.g., which includes the dimensions—years, revenue and product type from the first visualization) with the 'customer name' dimension from the second visualization, based on the fact that 'revenue' is a dimension that is common to (overlaps) both the first and second visualizations.

III. Selecting and Marking Portions of Visualizations

In some embodiments, data visualization generator 208 may receive input indicative of selection of a first portion of the visual representation of data in a first visualization of one or more visualizations displayed on GUI of client 202. The portion of data that is selected by a user (also referred to as highlighted data, marked data, brushed data, link source data, or analytic subset throughout this disclosure) can be data representing dimension members or data representing the relationship between different dimension members of one or more dimensions of a visualization. In an embodiment, a user may select more than one portion of the data represented by the visualization. These selected portions can be one or more bars (or sub-portions of a bar, a sub-segment, or item) in a bar chart, one or more pies/items in a pie chart, one or more objects/items in a scatterplot, and the like. In some embodiments, the user can select the one or more portions of data represented by a visualization via a touch-pad, a keyboard, a mouse, a combination of these or other types of input devices.

Based upon the selected portion, data visualization generator 208 may determine a set of one or more dimension members belonging to a set of one or more dimensions of the visualization and provide the determined set of one or more dimension members to mapping component 222. Mapping component 222 may then determine a second dimension member that is correlated to a first dimension member of the set of one or more dimension members. In some examples, the second dimension member may belong to a second dimension that is different from the first dimension.

In an embodiment, mapping component 222 may determine a second dimension member that is correlated to the first dimension member based on correlation information stored in CT information data store 220. For instance, mapping component 222 may identify that a particular correlation table contains the set of one or more dimension members related to the selected portion. Then, mapping component 222 may mark the set of one or more dimension members in the correlation table. In some embodiments, marking the set of one or more dimension members in the correlation table may also include marking the rows (record) of the correlation table that contains the set of one or more dimension members.

Additionally, in some embodiments, mapping component 222 may also mark one or more other dimension members (e.g., a second dimension member) that are correlated to the set of one or more dimension members in the marked set of rows. As noted above, in some examples, the second dimension member may belong to a second dimension that is different from the dimensions corresponding to the first set of one or more dimension members. Mapping component 222 may then identify a union set of the dimension members from the marked rows.

Mapping component 222 may then identify the visualization tables (e.g., from visualization information data store 218) other than the source visualization table (i.e., of the first visualization) that contain the union set of the dimension members and mark the dimension members and/or corresponding rows of the identified visualization tables that include the union set of dimension members. Mapping component 222 may then identify portions of the visualizations in each of the identified visualization tables that correspond to the marked rows. Then, mapping component 222 may highlight the identified portions of the visualizations displayed on the GUI (dashboard) of the client that correspond to the marked rows.

For instance, a user may select a portion of a visualization that corresponds to cell phones sold in a particular year (e.g., 2009). Based on the user's selection, data visualization generator 208 may determine that the set of one or more dimension members that correspond to the selected portion comprise a first dimension member (cell phones) and a second dimension (2009) corresponding to the visualization. Data visualization generator 208 may then provide the set of dimension members to mapping component 222. Mapping component 222 may then identify a correlation table stored in CT information data store 220 that contains the determined dimension members (cell phone, 2009) and mark all the rows and/or dimension members of the correlation table that contain the determined dimension members. In addition, mapping component 220 may also identify other dimension members (e.g., customers C1, C2, C3 who purchased cell phones during the year 2009) from the marked rows of the correlation table. Mapping component 222 may then identify rows in each visualization table (other than the source visualization table) stored in visualization information data store 218 that contain one or more of the marked dimension members and identify portions of the visualizations corresponding to the identified visualization tables that correspond to the marked dimension members. For instance, mapping component 222 may identify a portion of a second visualization that identifies one or more customers C1, C2 and C3 who purchased cell phones in the year 2009 and highlight those portions of the visualization.

In some embodiments, mapping engine 222 may send the marked information to visualization renderer 212 to enable the renderer to render the marking on the GUI of client 202. For instance, the GUI may display this rendering by showing a selection box around those portions/items identified to have been related to the originally selected portion. Different embodiments may present the relevant portions in the other visualizations differently, for example, by a highlighting, by a different color, by text and the like.

Figure 3:
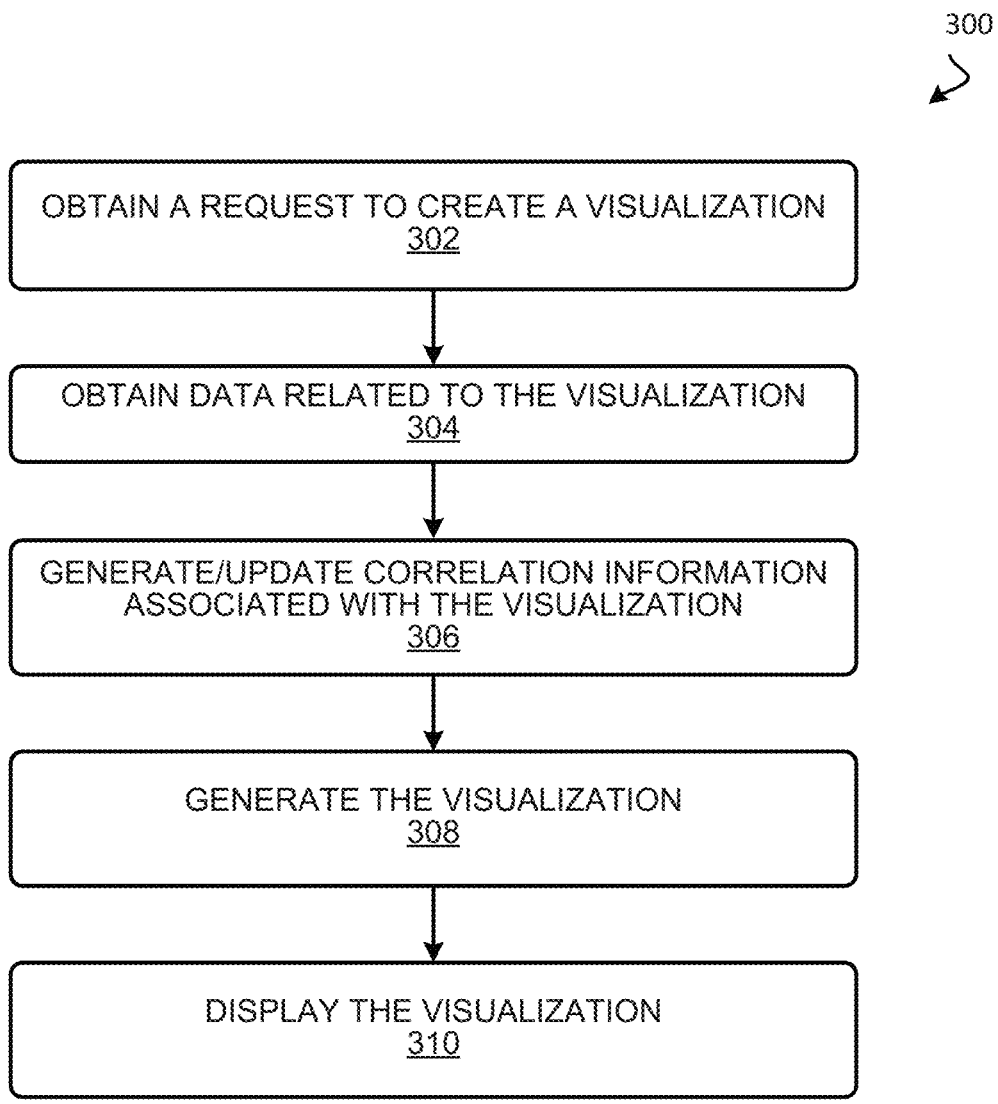
FIG. 3 illustrates a high level flow diagram of an example process for creating a visualization, in accordance with an embodiment of the present invention.
Figure 4:
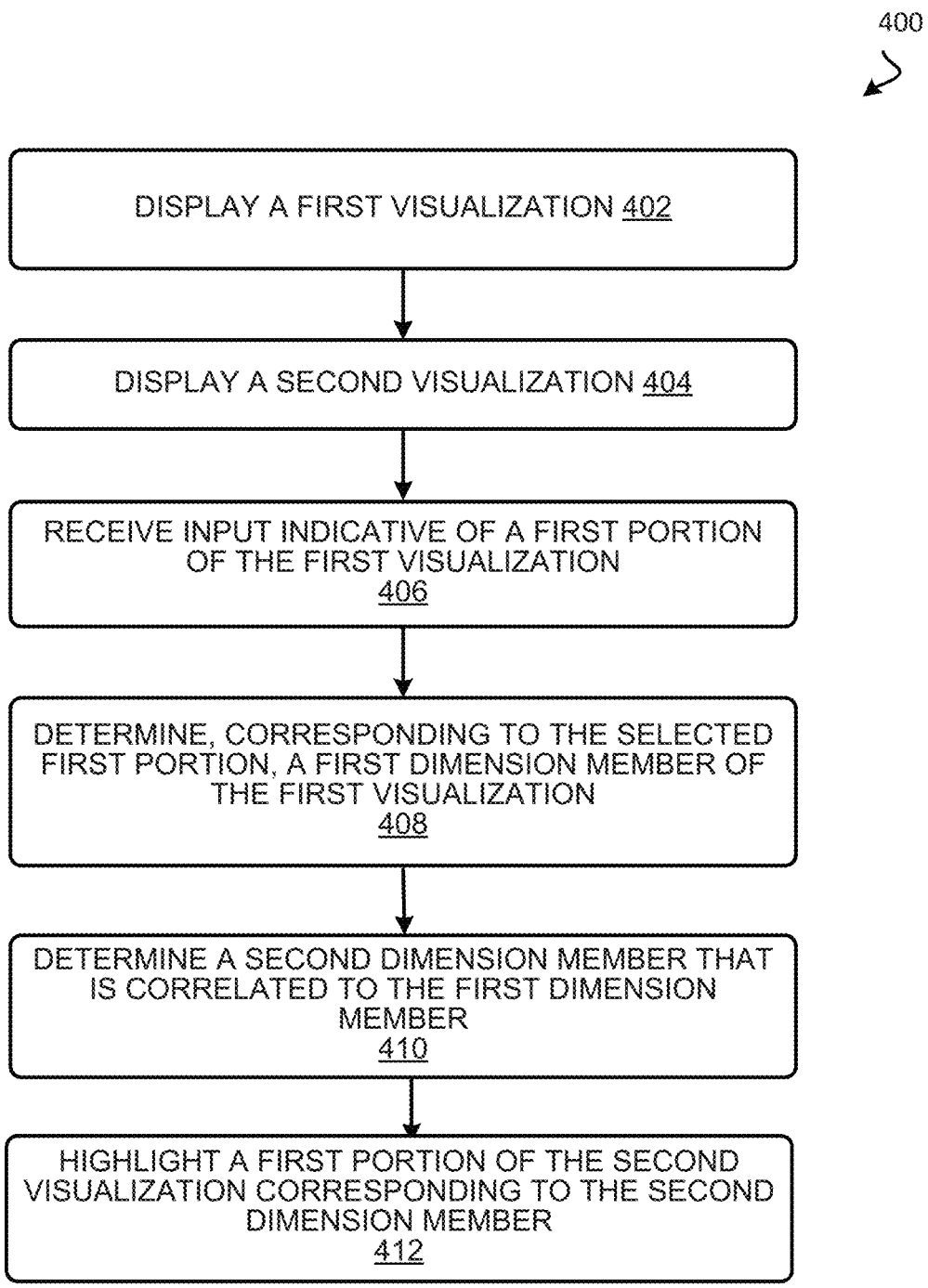
FIG. 4 illustrates a high level flow diagram of an example process for enabling cross visualization interaction between a plurality of data visualizations, in accordance with an embodiment of the present invention.
Figure 5:
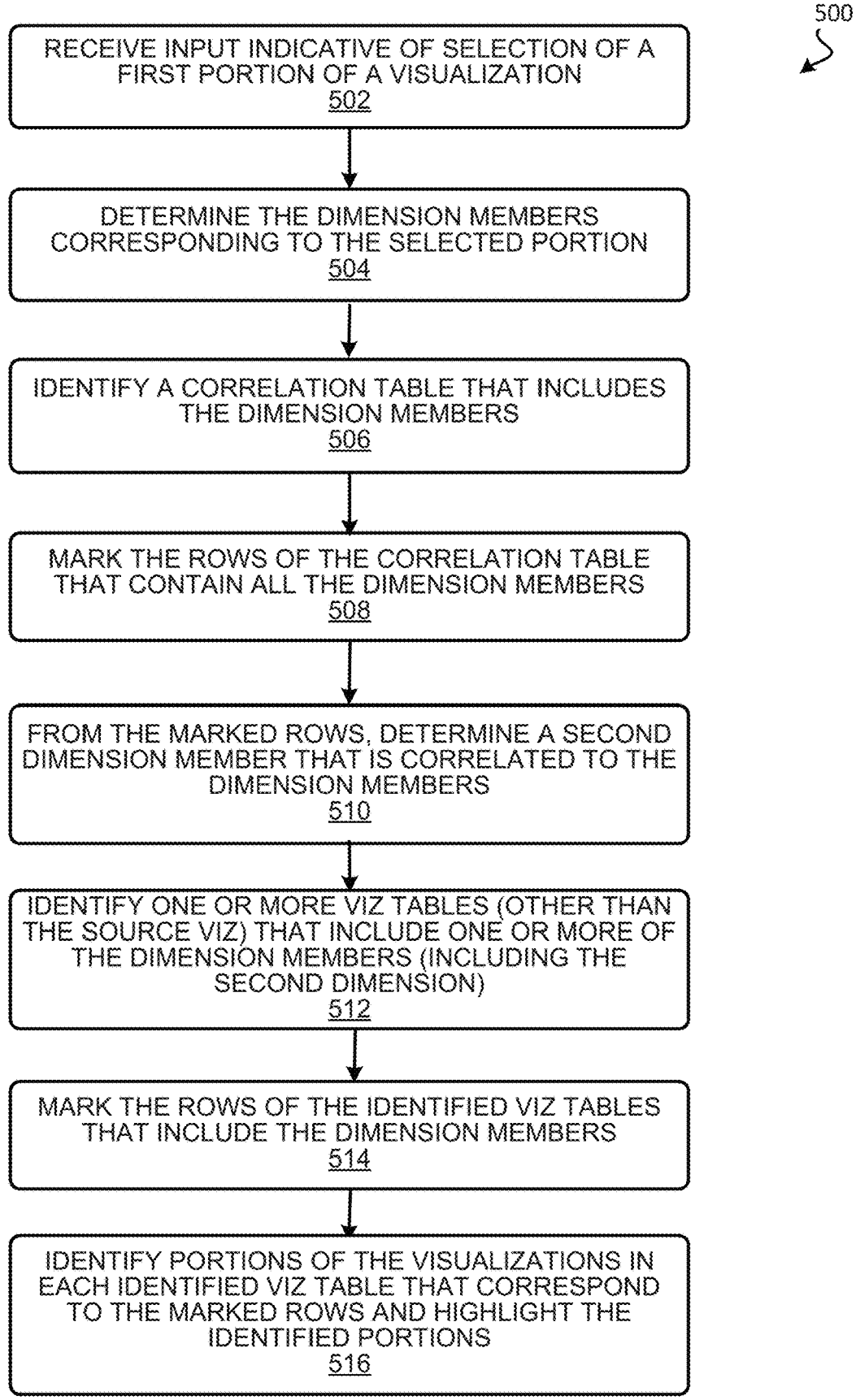
FIG. 5 illustrates a high level flow diagram of an example process for correlating data between one or more visualizations, in accordance with an embodiment of the present invention.

FIGS. 3-5 illustrate example flow diagrams showing respective processes 300, 400 and 500 of providing cross visualization interaction between data visualizations, according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the visual analyzer system (e.g., utilizing at least data visualization generator 208, query handler 206, correlation table builder 214, mapping component 222, visualization renderer 212 and UI subsystem 210) shown in at least FIG. 2 (and others) may perform the processes 300, 400 and 500 of FIGS. 3-5 respectively.

FIG. 3 illustrates a high level flow diagram of an example process 300 for creating a visualization, in accordance with an embodiment of the present invention. The process at 300 may begin at 302, when a request is received by data visualization generator 208 to create a visualization. For instance, as noted above, data visualization generator 208 may receive the request from UI subsystem 210 when a user specifies one or more dimensions of a desired visualization through a GUI on the user's client device. At 304, the process may include obtaining data related to the visualization. As noted above, in some embodiments, data visualization generator 208 may obtain the visualization data by transmitting a query to query handler 206, which may obtain the requested data from data server 204. Query handler 206 may then provide the obtained visualization data to data visualization generator 208.

In some embodiments, at 306 the process may include generating and/or updating correlation information associated with the visualization as the visualization is being created. As noted above, in some embodiments, the generation of correlation information may involve constructing one or more correlation tables based on the data used to generate the visualization. In some examples, the correlation tables may provide relationships between the dimensions associated with a visualization. In some embodiments, and as noted above, the process of generating and/or updating correlation information may include transmitting a query to query handler 206 to obtain correlation data related to a visualization and constructing one or more correlation tables based on the obtained correlation data.

At 308, the process may include generating the visualization. In some embodiments, the visualization is a visual representation of data of the one or more dimensions specified by the user. In some embodiments, the generated visualization may be rendered (e.g., by visualization renderer 212) which may render the visualization prior to transmitting the visualization to UI subsystem 210. At 310, the process may include displaying the visualization to the user via a GUI on the user's device. For instance, UI subsystem 210 may display the visualization via GUI in client 202.

FIG. 4 illustrates a high level flow diagram of an example process 400 for enabling cross visualization interaction between a plurality of data visualizations, in accordance with an embodiment of the present invention. The process at 400 may begin at 402, by displaying a first visualization via a GUI on the user's client device. At 404, the process may include displaying a second visualization to the user. At 406, the process may include receiving input indicative of selection of a first portion of the visual representation of first data in the first visualization. The first portion may include, for example, data representing one or more dimension members or data representing a relationship between the one or more dimension members of one or more dimensions of the first visualization.

In some embodiments, at 408, the process may include determining, corresponding to the selected first portion, a first dimension member belonging to a first dimension of the first visualization. At 410, the process may include determining a second dimension member that is correlated to the first dimension member. In some examples, the second dimension member may belong to a second dimension that is different from the first dimension member. For instance, as noted above, the second dimension member may be determined based on correlation information stored in CT information data store 220. In some embodiments, at 412, the process may include highlighting a first portion of the second visualization corresponding to the second dimension member. The processes 410 and 412 of determining a second dimension member and highlighting a first portion of the second visualization corresponding to the second dimension member are discussed in detail in relation to FIG. 5.

FIG. 5 illustrates a high level flow diagram of an example process 500 for correlating data between one or more visualizations, in accordance with an embodiment of the present invention. In some embodiments, the process 500 may be triggered at 502 when a user selects a portion of data in a visualization displayed on the user's client device. At 504, the process includes determining a set of one or more dimension members corresponding to the selected portion. At 506, the process includes identifying a correlation table that comprises the determined set of one or more dimension members. At 508, the process includes marking the rows of the correlation table that include the set of one or more dimension members. At 510, the process includes determining, from the marked rows, at least a second dimension member that is correlated to the set of one or more dimension members.

In some embodiments, at 512, the process includes identifying one or more visualization tables (other than the source visualization table corresponding to the first visualization) that include the set of one or more dimension members (including the second dimension). At 514, the process includes marking the rows of the identified visualization tables that include the set of one or more dimension members. At 516, the process includes identifying portions of the visualizations in each of the identified visualization tables that correspond to the marked rows. In some examples, the process at 516 includes highlighting the identified portions of the visualizations for the user, via a GUI displayed on the user's client device.

The discussion below provides exemplary illustrations of visualizations displayed via a GUI of the user's client and the manner in which cross visualization interaction between one or more visualizations can be facilitated by the visual analyzer system, in accordance with some embodiments of the present invention.

FIG. 6 is a graphical illustration of a plurality of visualizations displayed on a GUI of a client device, in accordance with an embodiment of the present invention. In some examples, the GUI may be viewable via a browser application on the client device (e.g., 202). The depicted embodiment shows three visualizations, 600, 602 and 604 displayed to a user on the client device. Although the depicted embodiment shows three visualizations, 600, 602 and 604, it is to be appreciated that more or less visualization may be displayed by the visual analyzer system of the present disclosure, in other embodiments. In the example show in this figure, visualization 600 is a visual representation of data that relates to the revenue generated by the sales of different types of products (cell phones, fixed phones and LCD phones) during a period of time (e.g., 2008-2010). Visualization 602 is a visual representation of data that relates to the revenue generated by various customers of an organization. Visualization 604 is a visual representation of data that relates to the revenue generated by different brands during different years (2008-2010).

Additionally, the illustrated example shows that a user has selected a portion 606 of the visual representation of data in visualization 600. For instance, the selected portion 606 is a sub-portion of a bar in visualization 600. As noted above, the user may select the portion of data represented by any of the displayed visualizations, 600, 602 and 604 via a touchpad, a keyboard, a mouse, a combination of these or other types of input devices. In the illustrated example, the selected portion corresponds to data related to cell phones sold in the year 2009. In some embodiments, the user may simultaneously select more than one portion of the data represented in any visualization.

The illustrated example also shows highlighted portions 608, 610, 612 and 614 in visualization 602 and a highlighted portion 616 in visualization 604. These highlighted portions correspond to corresponding portions of data in other visualizations determined by the visualize analyzer system that correspond to the selected portion of the data (606) by the user. As discussed in FIG. 2, these highlighted portions may be determined when visualize analyzer system (e.g., 200) identifies one or more visualization tables (other than the source visualization table corresponding to visualization, 600) that contain the set of one or more dimension members (i.e., cell phones, 2009) in the portion of data 606 selected by the user.

FIG. 7 is an exemplary illustration of a correlation table corresponding to a set of one or more visualizations, in accordance with an embodiment of the present invention. The illustrated example shows a correlation table 700 that is constructed based on the data corresponding to the visualizations 600, 602 and 604 depicted in FIG. 6. In addition, correlation table 700 may provide relationships between the one or more dimensions of the visualization data associated with the visualizations. In the illustrated example, correlation table 700 includes dimension members corresponding to one or more dimensions such as customer name, revenue, product type, product brand and years associated with visualizations 600, 602 and 604. In some embodiments, correlation table 700 may be constructed incrementally. The incremental construction of correlation table 700 is discussed in detail in relation to FIGS. 9-14B below.

FIG. 8 is an illustration of a correlation table 800 in which the rows of the correlation table that identify dimension members of a selected portion of a visualization are marked, in accordance with an embodiment of the present invention. Per the example shown in FIG. 6, the dimension members of the selected portion 606 of visualization 600 are identified as "cell phone" and "2009." Thus, all the rows of correlation table 800 that contain the dimension members, "cell phone" and "2009" are marked. For example, the marked rows in correlation table 800 are indicated with a symbol, 'X' next to the identified dimension members.

The discussion below describes the manner in which a correlation table can be constructed and/or generated for a set of one or more visualizations, in accordance with embodiments of the present invention. As noted above, in some embodiments, correlation table builder 214 can construct a correlation table incrementally as the user adds dimensions of data to an existing visualization and/or as the user adds more visualizations to the system.

Figure 9:
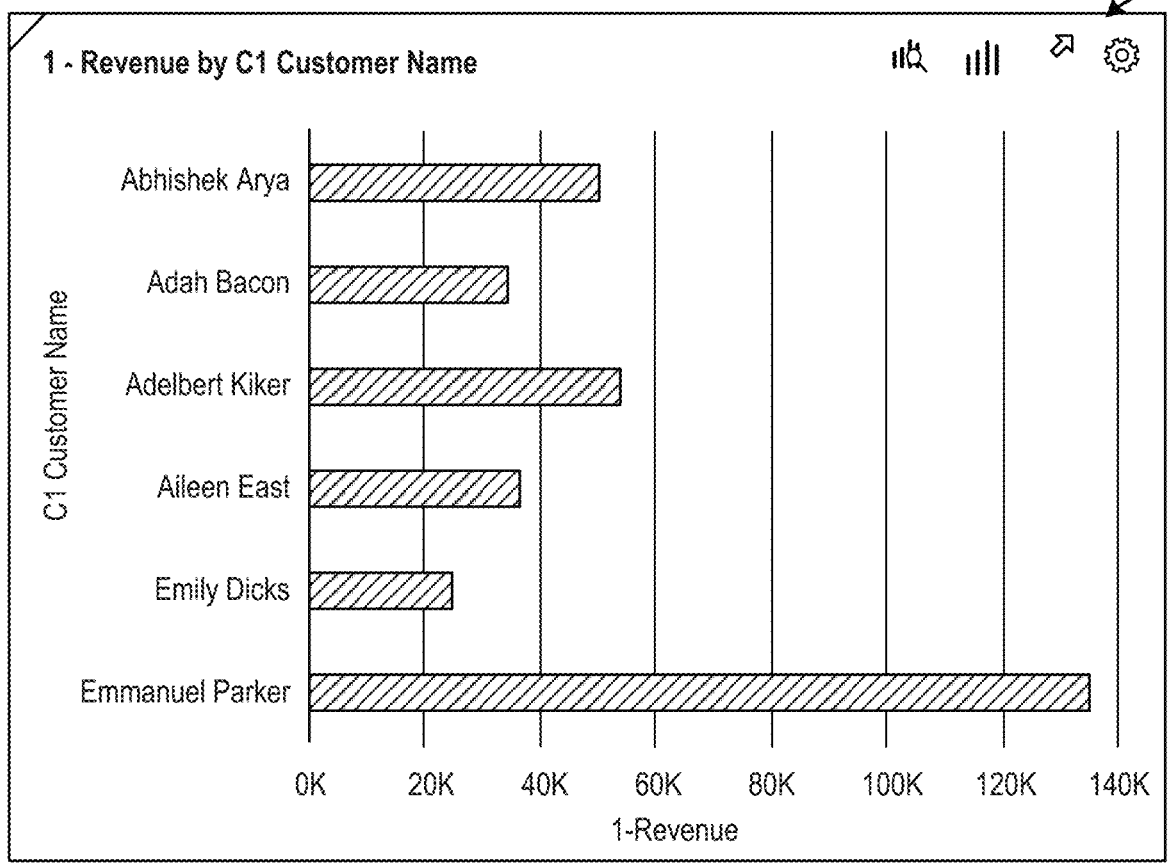
FIG. 9 is an exemplary illustration of a correlation table associated with a visualization displayed on the user's client device.

FIG. 9 is an exemplary illustration of a correlation table associated with a visualization displayed on the user's client device. As shown, visualization 900 is an exemplary visualization that is generated by visual analyzer system (e.g., 200) when a user specifies the dimensions, 'revenue' and 'customer name.' Correlation table 902 is a correlation table that is constructed when visualization 900 is generated by the visual analyzer system.

Figure 10A:
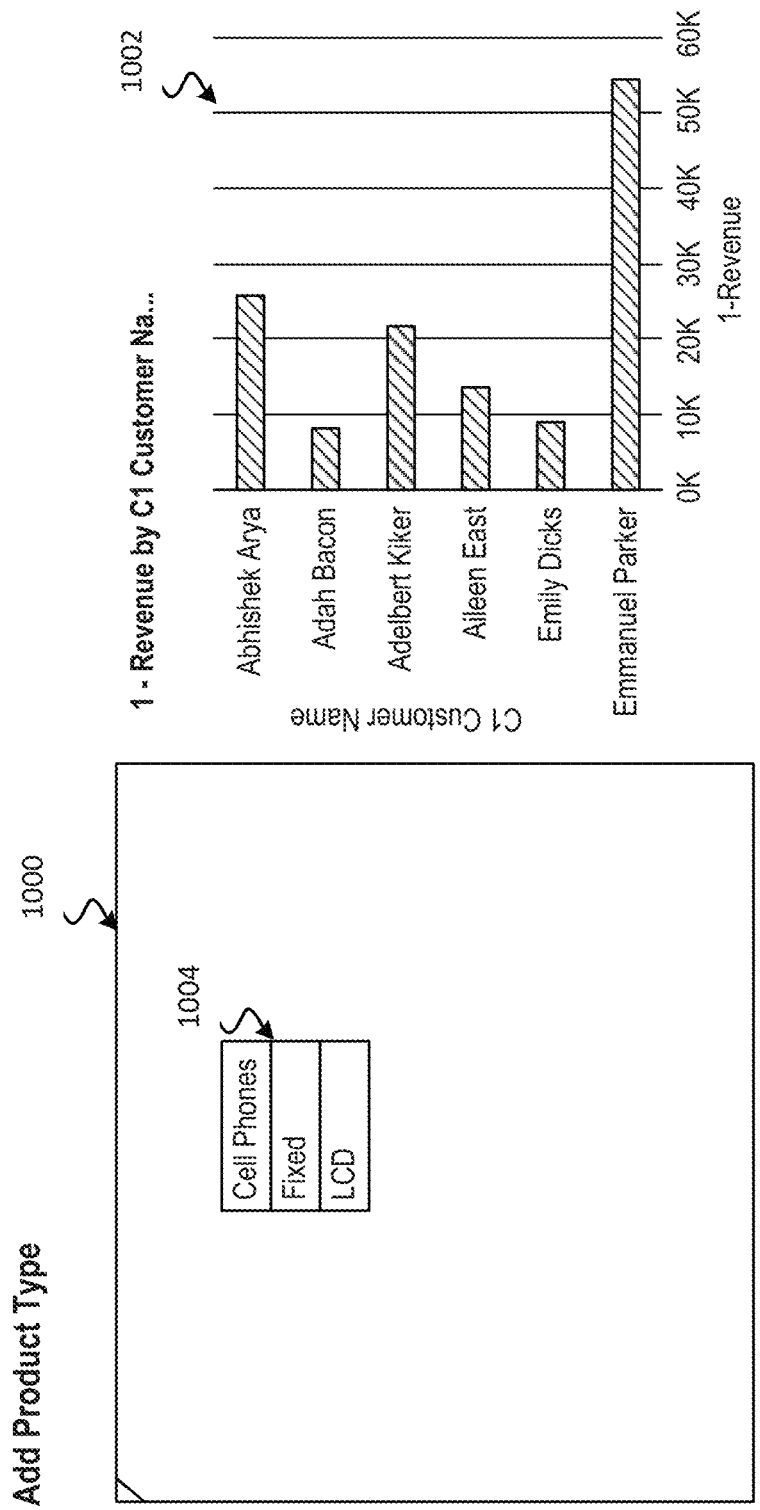
FIG. 10A is an exemplary illustration of the addition of a new dimension to the data represented by a visualization by a user, in accordance with an embodiment of the present invention.

FIG. 10A is an exemplary illustration of the addition of a new dimension to the data represented by a visualization by a user, in accordance with an embodiment of the present invention. In the depicted example, a user adds a 'product type' dimension with dimension members, 'cell phones', 'fixed' and 'LCD,' via GUI 1000 to visualization 1002. As illustrated, visualization 1002 is a visual representation of data that relates to the revenue generated by different customers of an organization.

Figure 10B:
FIG. 10B is an exemplary illustration of a correlation table that gets generated when a user adds a first dimension to a visualization displayed on the user's client device.

FIG. 10B is an exemplary illustration of a correlation table that gets generated when a user adds a first dimension to a visualization displayed on the user's client device. In the illustrated example, correlation table 1006 is a correlation table that is constructed when the user adds the 'product type' dimension with dimension members, 'cell phones', 'fixed' and 'LCD,' via GUI 1000 to visualization 1002 (shown in FIG. 10A). As may be observed, correlation table 1006 is incrementally constructed and/or updated when the user adds a dimension to visualization 1002.

Figure 11:
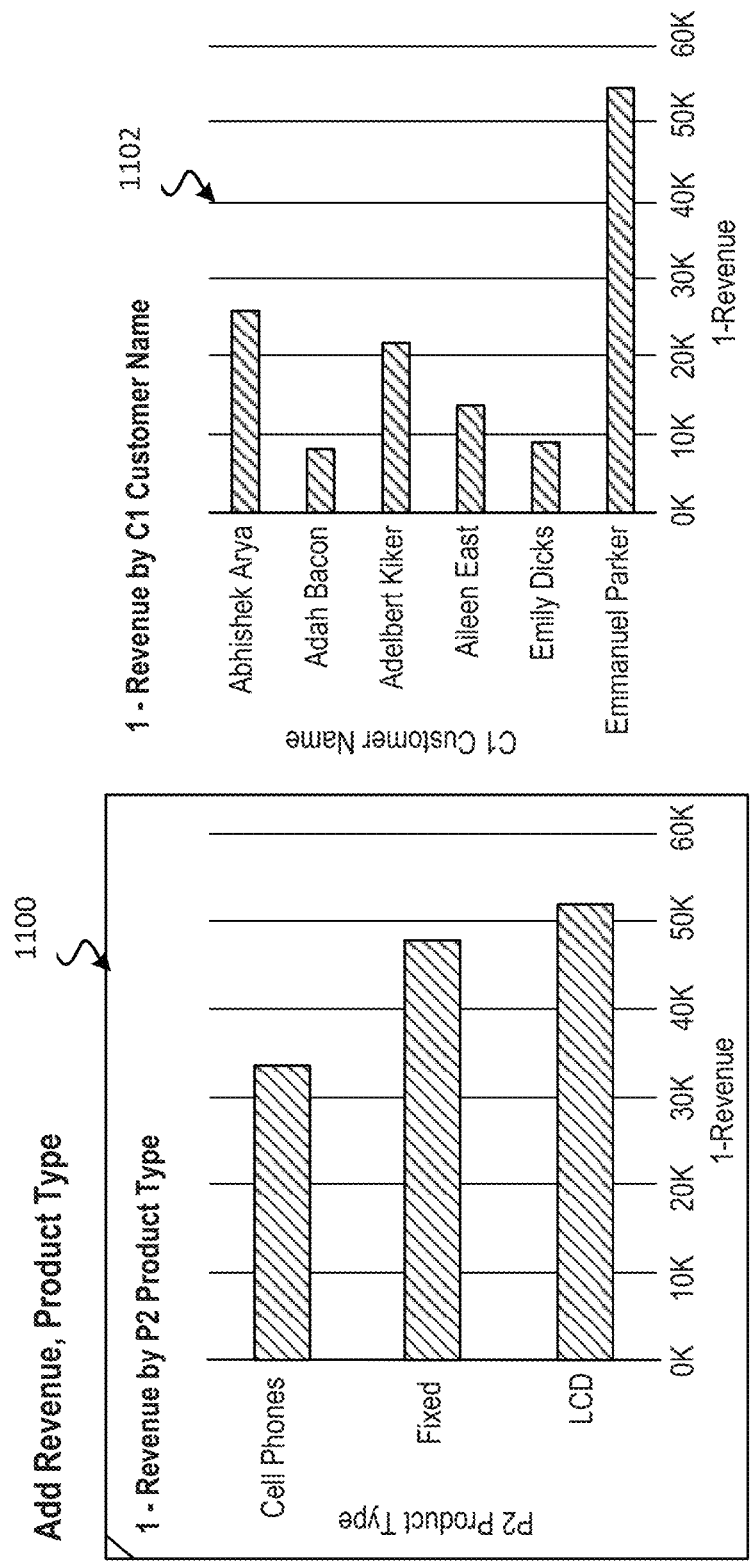
FIG. 11 is an exemplary illustration of the addition of a new visualization by a user, in accordance with an embodiment of the present invention.

FIG. 11 is an exemplary illustration of the addition of a new visualization by a user, in accordance with an embodiment of the present invention. In the depicted example, a user specifies one or more dimensions, 'Revenue' and 'Product Type,' to create a new visualization 1100. Thus, the user's dashboard now displays two visualizations, 'Revenue P2 Product Type,' 1100 and 'Revenue C1 by Customer Name,' on the dashboard of the user's device. In this embodiment, existing correlation table 1006 may not require to be updated since the new dimensions, 'Revenue,' and 'Product Type,' already exist in correlation table 1006.

Figure 12A:
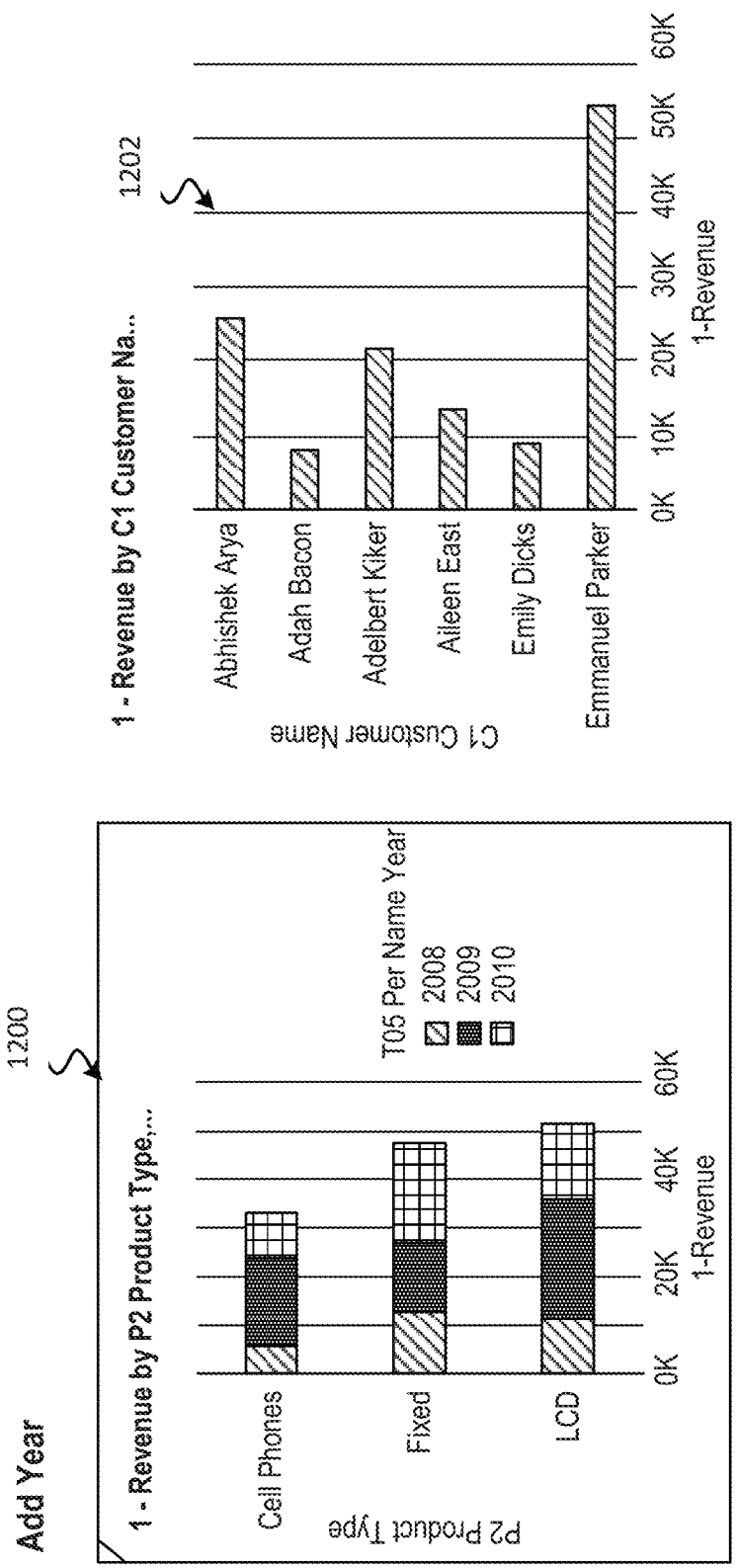
FIG. 12A is an exemplary illustration of the addition of a new dimension to the data represented by a visualization by a user, in accordance with an embodiment of the present invention.

FIG. 12A is an exemplary illustration of the addition of a new dimension to the data represented by a visualization by a user, in accordance with an embodiment of the present invention. In the depicted example, the user adds a 'year' dimension with dimension members, '2008', '2009,' and '2010,' to visualization 1200. The depicted example also illustrates another visualization 1202 displayed on the dashboard of the user's client device.

FIG. 12B is an exemplary illustration of an updated correlation table that is generated based on the addition of a new dimension to a visualization, by a user. In the illustrated example, correlation table 1204 is a correlation table that is constructed when the user adds the 'year' dimension with dimension members, '2008', '2009,' and '2010,' to visualization 1200 (shown in FIG. 12A). As may be observed, correlation table 1204 is incrementally updated when the user adds the 'year' dimension to the visualization.

Figure 13:
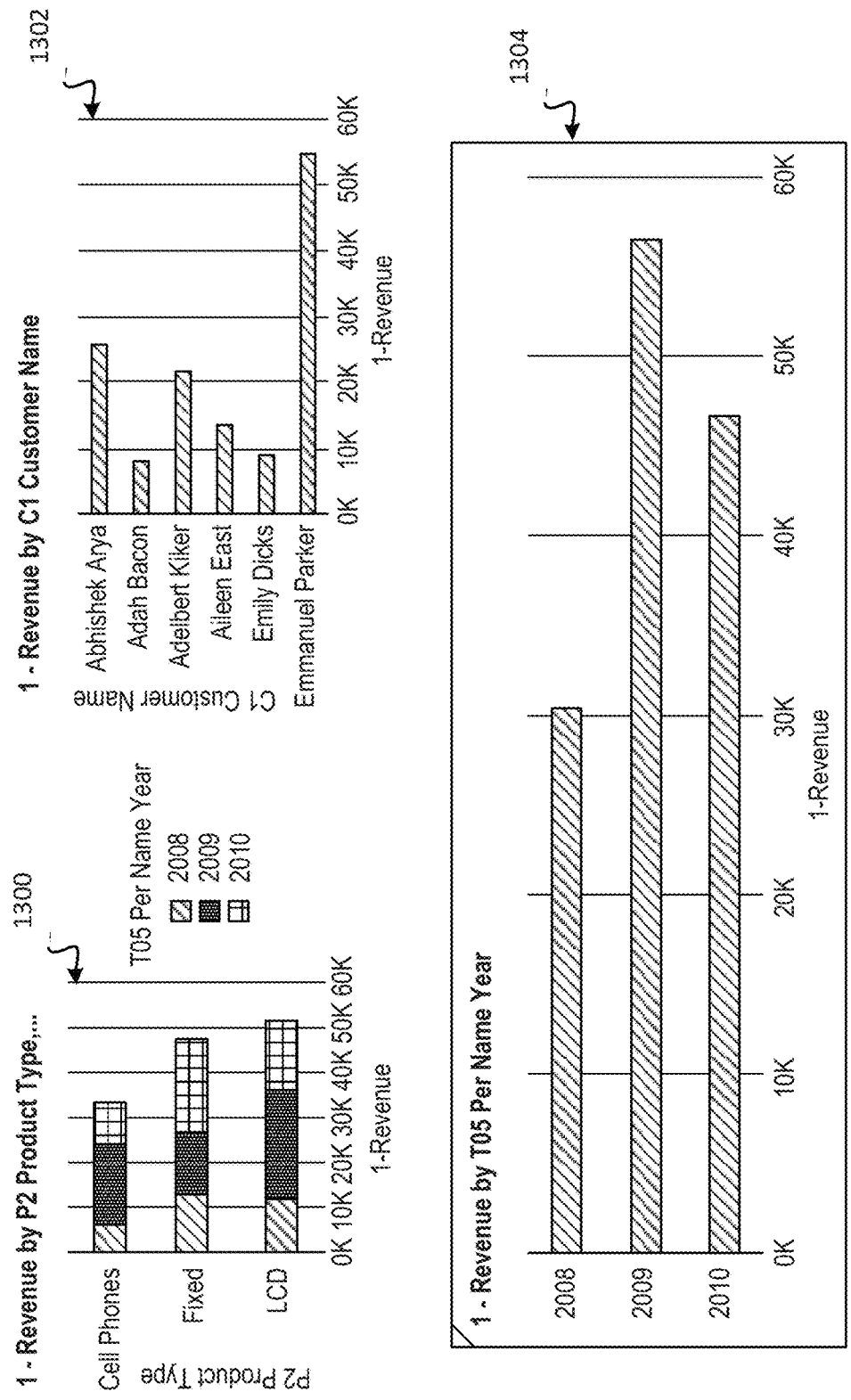
FIG. 13 is an exemplary illustration of the addition of a new visualization by a user, in accordance with an embodiment of the present invention.

FIG. 13 is an exemplary illustration of the addition of a new visualization by a user, in accordance with an embodiment of the present invention. In the depicted example, a user specifies one or more dimensions, 'Year and 'Revenue,' to create a new visualization 1300. Thus, the user's dashboard now displays three visualizations, 'Revenue P2 Product Type,' 1300, 'Revenue C1 by Customer Name,' 1302 and 'Revenue T05 Per Name Year,' 1304 on the dashboard of the user's device. In this embodiment, existing correlation table 1204 may not require to be updated since the new dimensions, 'Year,' and 'Revenue,' already exist in correlation table 1204.

FIG. 14A is an exemplary illustration of the addition of a new dimension to the data represented by a visualization by a user, in accordance with an embodiment of the present invention. In the depicted example, the user adds a 'brand' dimension with dimension members, 'Biz Tech', 'FunPod' and 'HomeView,' to visualization 1404. The depicted example also illustrates other visualizations 1400 and 1402 displayed on the dashboard of the user's client device.

FIG. 14B is an exemplary illustration of an updated correlation table that is generated based on the addition of a new dimension to a visualization, by a user. In the illustrated example, correlation table 1406 is a correlation table that is constructed when the user adds the 'brand dimension with dimension members 'Biz Tech', 'FunPod,' and 'HomeView,' to visualization 1404 (shown in FIG. 14A). As may be observed, correlation table 1406 is incrementally updated when the user adds the 'brand' dimension to the visualization.

The above discussion described techniques and examples by which the visual analyzer system correlated data among different visualizations by constructing a single correlation table to represent the data and the relationships between the data associated with the different visualizations. In some embodiments, the visual analyzer system may be capable of constructing and/or generating multiple correlation tables to represent the data associated with a plurality of visualizations. This situation may occur, for instance, when the cardinality of the data is relatively high, resulting in a large number of records or when there are many unique dimensions (columns) of the visualizations that have the potential to generate many records in the correlation table. For instance, as noted above, the visual analyzer system may determine that data related to a dimension and/or visualization specified by the user can be added to an existing correlation table based on the number of dimensions in each of the visualization tables that are common (overlap with each other). The manner in which the visual analyzer system may generate multiple correlation tables to represent the data and the relationships between the data associated with different visualizations is discussed below.

Figure 15:
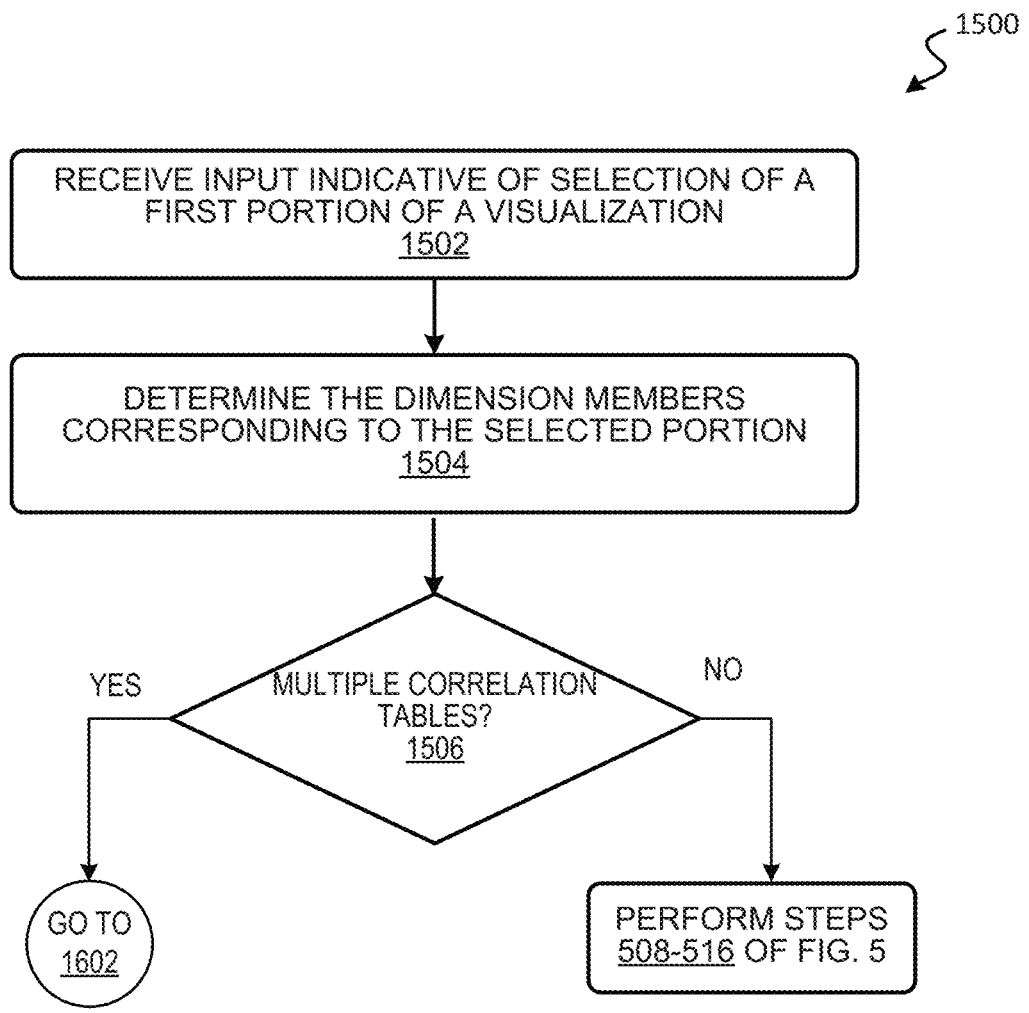
FIG. 15 illustrates a high level flow diagram of an example process for performing data correlation between a plurality of visualizations, in accordance with an embodiment of the present invention.

FIG. 15 illustrates a high level flow diagram of an example process 1500 for performing data correlation between a plurality of visualizations, in accordance with an embodiment of the present invention. In some embodiments, the process at 1500 may be triggered when visual analyzer system (e.g., 200) receives input indicative of selection of a first portion of a visualization from a user, at 1502. At 1504, the process includes determining the dimension members corresponding to the selected portion. At 1506, the process includes determining if there are multiple correlation tables constructed for the plurality of displayed visualizations. If it is determined that there is only correlation table constructed for the plurality of visualizations, then, in one embodiment, the steps 506-516 described in FIG. 5 are performed. If it is determined that multiple correlation tables have been constructed for the plurality of displayed visualizations, in in some embodiments, the process 1602 of FIG. 16 is performed.

Figure 16:
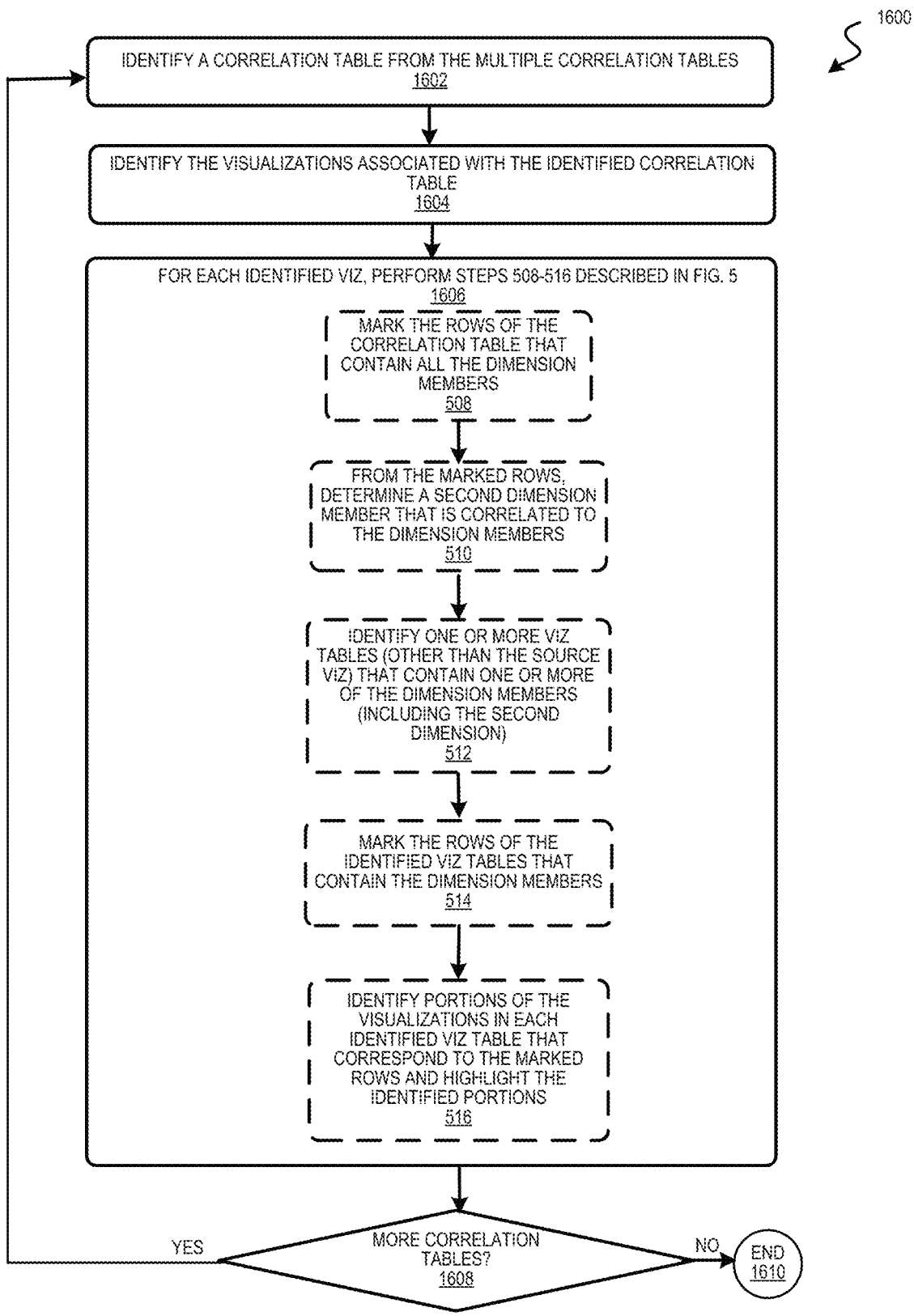
FIG. 16 illustrates a high level flow diagram of an example process for performing data correlation between a plurality of visualizations based on multiple correlation tables, in accordance with an embodiment of the present invention.

FIG. 16 illustrates a high level flow diagram of an example process 1600 for performing data correlation between a plurality of visualizations based on multiple correlation tables, in accordance with an embodiment of the present invention. The process of 1600 may be triggered, for instance, when visual analyzer system determines that there are multiple correlation tables associated with a plurality of displayed visualizations (step 1506 of FIG. 15). At 1602, the process includes identifying a correlation table from the multiple correlation tables. At 1604, the process includes identifying the visualizations associated with the identified correlation table.

At 1606, the process includes performing the processes 508-516 described in FIG. 5 for each identified visualization. For instance, the process at 1606 may include performing, for each identified visualization, marking the rows of the identified correlation table that contains the identified dimension members corresponding to the selected portion, determining a second dimension member that is correlated to the identified dimension members from the marked rows, identifying one or more visualization tables (other than the source visualization) that contain one or more of the dimension members (including the second dimension), marking the rows of the identified visualization tables that contain the dimension members and identifying portions of the visualizations in each identified visualization table that correspond to the marked rows and highlighting the identified portions.

At 1608, the process includes determining if there are more correlation tables. If it is determined that additional correlation tables exist, then in one embodiment, the process loops back to step 1602 to identify the next correlation table from the multiple correlation tables. If it is determined that no more correlation tables exist, then in one embodiment, the process ends at 1610.

The process of performing cross visualization interaction between a plurality of visualizations when there are multiple correlation tables associated with the plurality of visualizations is discussed in relation to the examples shown in FIGS. 17-19 below.

Figure 17:
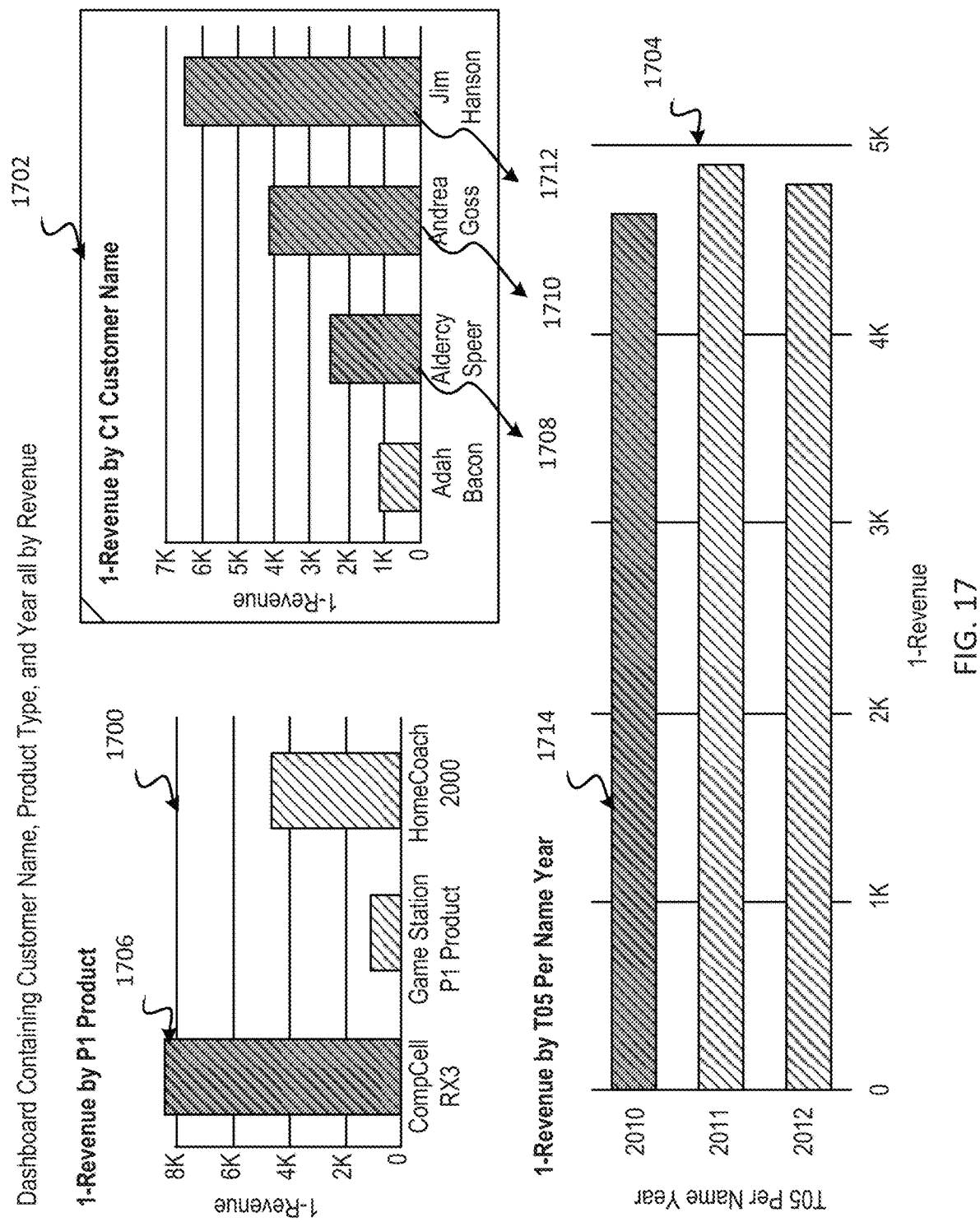
FIG. 17 is a graphical illustration of a plurality of visualizations displayed on a GUI of a client device, in accordance with an embodiment of the present invention.

FIG. 17 is a graphical illustration of a plurality of visualizations displayed on a GUI of a client device, in accordance with an embodiment of the present invention. In some examples, the GUI may be viewable via a browser application on the client device (e.g., 202). The depicted embodiment shows three visualizations, 1700, 1702 and 1704 displayed to a user on the client device. Although the depicted embodiment shows three visualizations, 1700, 1702 and 1704, it is to be appreciated that more or fewer visualizations may be displayed by the visual analyzer system of the present disclosure, in other embodiments.

In the example shown in this figure, visualization 1700 is a visual representation of data that relates to the revenue generated by the sales of different types of products (compcell RX3, Game Station, HomeCoach 2000). Visualization 1702 is a visual representation of data that relates to the revenue generated by various customers of an organization. Visualization 1704 is a visual representation of data that relates to the revenue generated by a product during different years (2010-2012).

Additionally, the illustrated example shows that a user has selected a portion 1706 of the visual representation of data in visualization 1700. For instance, the selected portion 1700 is a bar in visualization 1700. The illustrated example also shows highlighted portions 1708, 1710, 1712 and 1714 in visualization 1702 and a highlighted portion 1714 in visualization 1704. These highlighted portions correspond to corresponding portions of data in other visualizations determined by the visualize analyzer system that correspond to the selected portion of the data (1706) by the user. As discussed above, these highlighted portions may be determined when visualize analyzer system (e.g., 200) identifies one or more visualization tables (other than the source visualization table corresponding to visualization, 1700) that contain the set of one or more dimension members (i.e., compcell RX3) in the portion of data 1706 selected by the user.

FIG. 18 is an exemplary illustration of multiple correlation tables corresponding to a set of one or more visualizations, in accordance with an embodiment of the present invention. The illustrated example shows a correlation table 1802 associated with the data corresponding to visualizations 1700 and 1704 (depicted in FIG. 17), a correlation table 1804 associated with data corresponding to visualizations 1700 and 1702 and a correlation table 1806 associated with data corresponding to visualizations 1702 and 1704. As may be observed, correlation tables 1802, 1804 and 1806 include data related to one or more dimensions (e.g., revenue, product, customer name, and the like) of visualizations 1700, 1702 and 1706.

Figure 19:
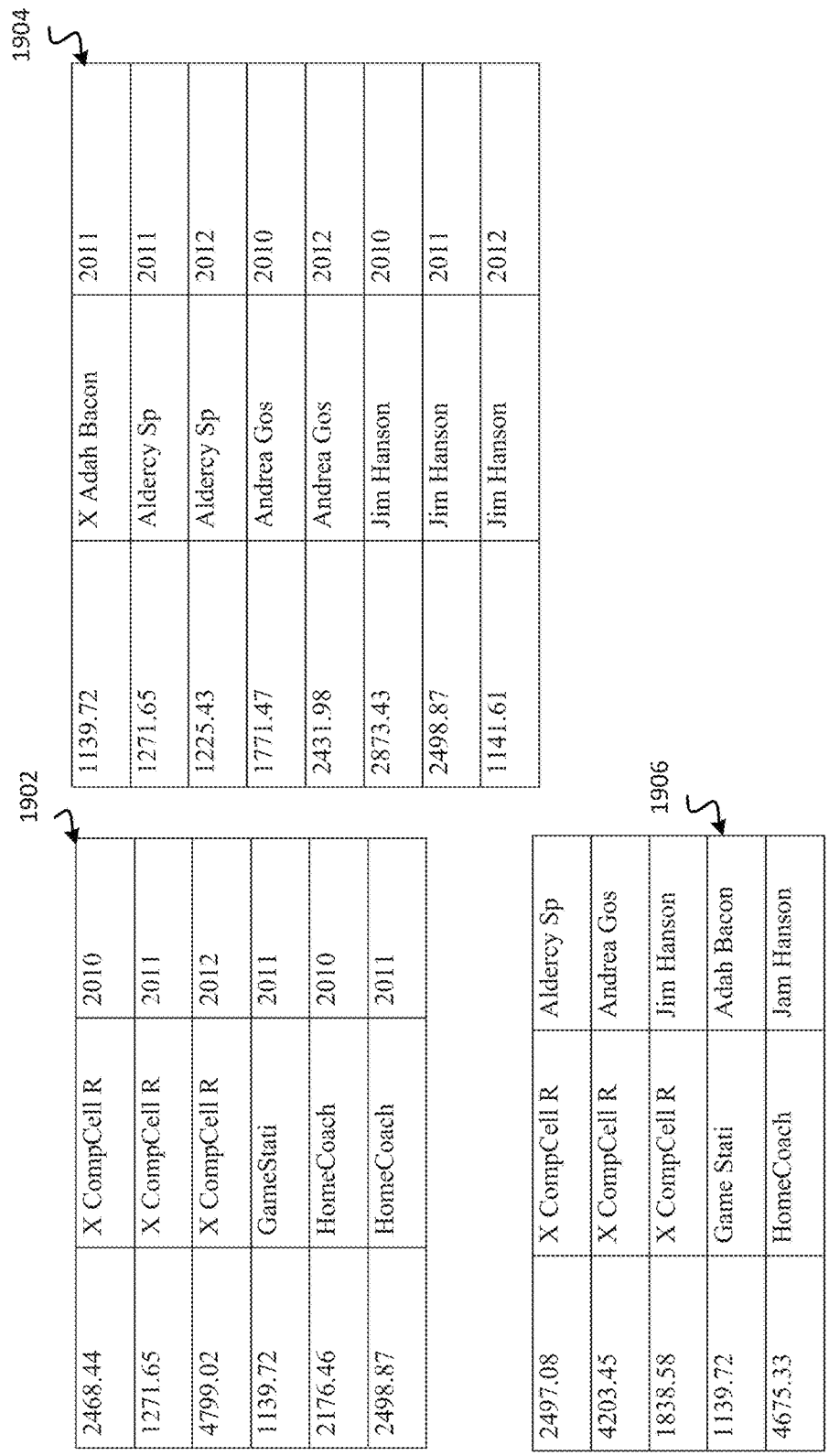
FIG. 19 is an illustration of multiple correlation tables in which the rows of the correlation tables that identify dimension members of selected portions of one or more visualizations are marked, in accordance with an embodiment of the present invention.

FIG. 19 is an illustration of multiple correlation tables in which the rows of the correlation tables that identify dimension members of a selected portion of a visualization are marked, in accordance with an embodiment of the present invention. Per the example shown in FIG. 17, the dimension members of the selected portion 1706 of visualization 1700 may be identified as "compCell Rx3." Thus, all rows of the correlation tables 1902, 1904 and 1906 which contain the dimension member, "compCell Rx3" are marked. In an example, the marked rows in correlation tables 1902, 1904 and 1906 are indicated with a symbol, 'X' next to the identified dimension member.

Figure 20:
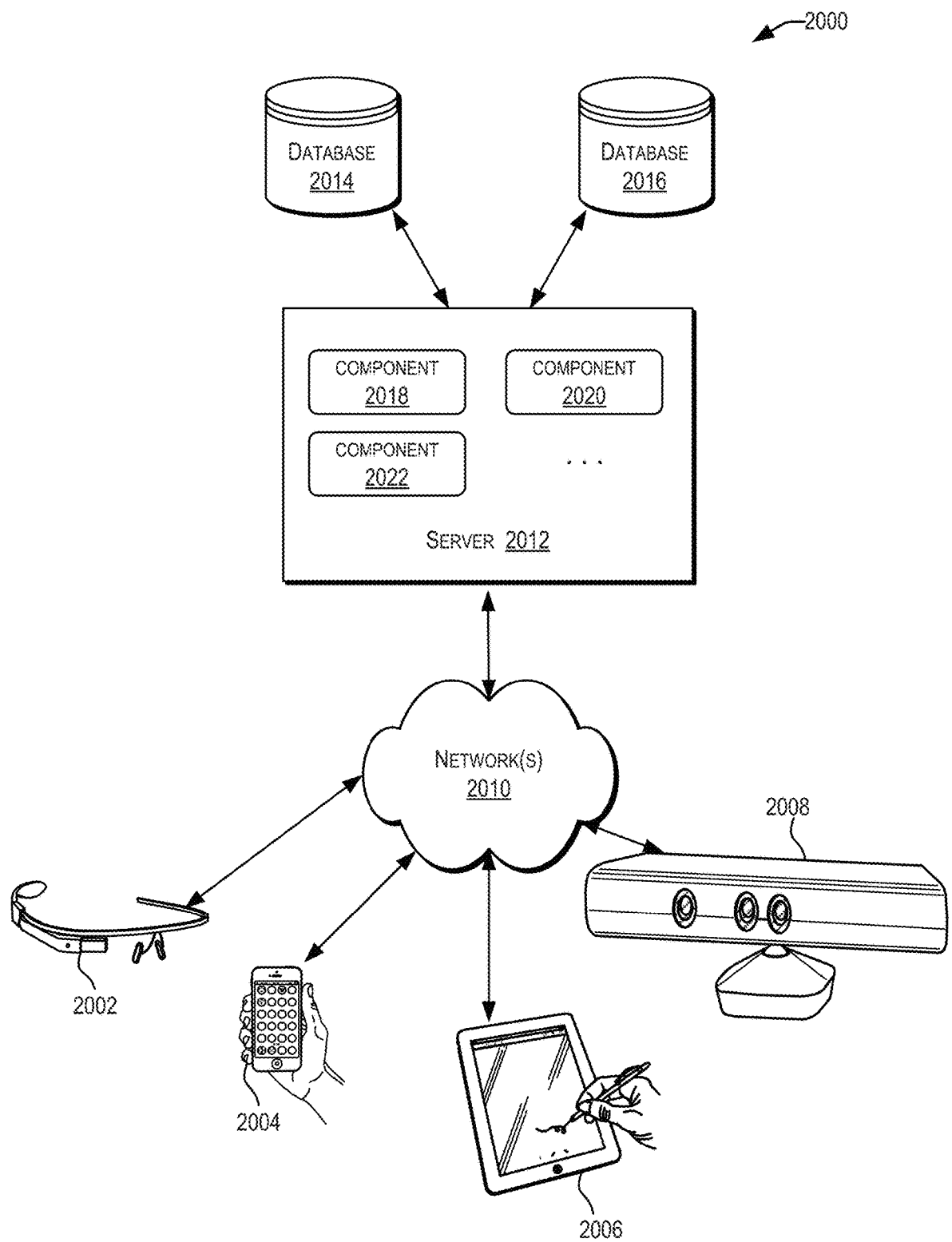
FIG. 20 depicts a simplified diagram of a distributed system for implementing an embodiment of the present disclosure.
Figure 21:
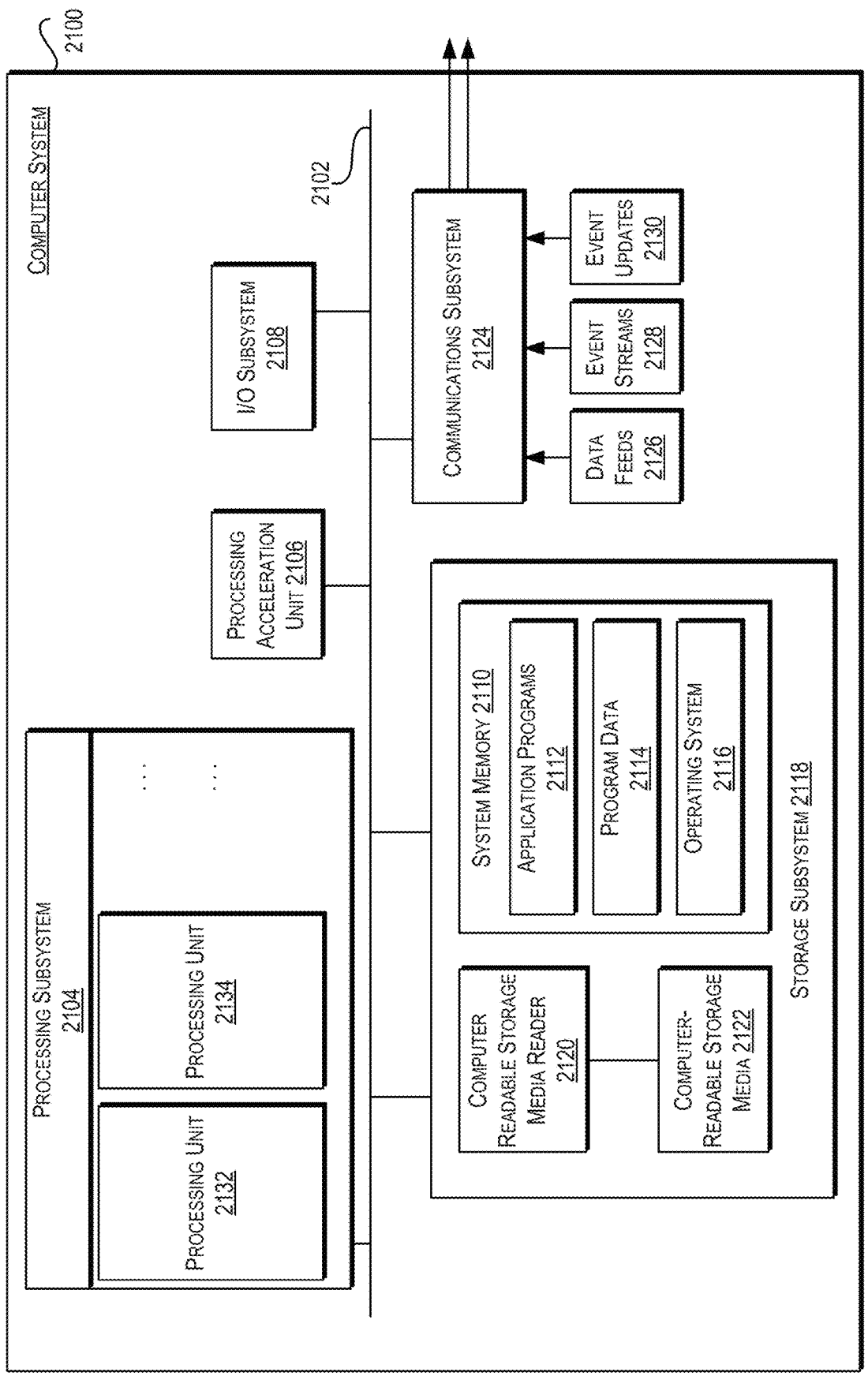
FIG. 21 illustrates an exemplary computer system that may be used to implement an embodiment of the present invention.

FIGS. 20-21 illustrate aspects of example environments for implementing aspects of the present invention in accordance with various embodiments. FIG. 20 depicts a simplified diagram of a distributed system 2000 for implementing an embodiment of the present disclosure. In the illustrated embodiment, the distributed system 2000 includes one or more client computing devices 2002, 2004, 2006, and 2008, which are configured to execute and operate a client application such as a web browser, proprietary client (e.g., Oracle Forms), or the like over one or more network(s) 2010. The server 2012 may be communicatively coupled with the remote client computing devices 2002, 2004, 2006, and 2008 via network 2010.

In various embodiments, the server 2012 may be adapted to run one or more services or software applications such as services and applications that provide identity management services. In certain embodiments, the server 2012 may also provide other services or software applications can include non-virtual and virtual environments. In some embodiments, these services may be offered as web-based or cloud services or under a Software as a Service (SaaS) model to the users of the client computing devices 2002, 2004, 2006, and/or 2008. Users operating the client computing devices 2002, 2004, 2006, and/or 2008 may in turn utilize one or more client applications to interact with the server 2012 to utilize the services provided by these components.

In the configuration depicted in FIG. 20, the software components 2018, 2020 and 2022 of system 2000 are shown as being implemented on the server 2012. In other embodiments, one or more of the components of the system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The embodiment shown in FIG. 20 is thus one example of a distributed system for implementing an embodiment system and is not intended to be limiting.

The client computing devices 2002, 2004, 2006, and/or 2008 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 2010.

Although distributed system 2000 in FIG. 20 is shown with four client computing devices, any number of client computing devices may be supported. Other devices, such as devices with sensors, etc., may interact with the server 2012.

The network(s) 2010 in the distributed system 2000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 2010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 2012 can include one or more virtual machines running virtual operating systems, or other computing architectures involving virtualization. One or more flexible pools of logical storage devices can be virtualized to maintain virtual storage devices for the server. Virtual networks can be controlled by the server 2012 using software defined networking. In various embodiments, the server 2012 may be adapted to run one or more services or software applications described in the foregoing disclosure. For example, the server 2012 may correspond to a server for performing processing as described above according to an embodiment of the present disclosure.

The server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 2012 may include one or more applications to analyze and consolidate data feeds and/or event updates received from users of the client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 2012 may also include one or more applications to display the data feeds and/or real-time events via one or more display devices of the client computing devices 2002, 2004, 2006, and 2008.

The distributed system 2000 may also include one or more databases 2014 and 2016. These databases may provide a mechanism for storing information such as user identity information, and other information used by embodiments of the present invention. Databases 2014 and 2016 may reside in a variety of locations. By way of example, one or more of databases 2014 and 2016 may reside on a non-transitory storage medium local to (and/or resident in) the server 2012. Alternatively, the databases 2014 and 2016 may be remote from the server 2012 and in communication with the server 2012 via a network-based or dedicated connection. In one set of embodiments, the databases 2014 and 2016 may reside in a storage-area network (SAN). Similarly, any necessary files for performing the functions attributed to the server 2012 may be stored locally on the server 2012 and/or remotely, as appropriate. In one set of embodiments, the databases 2014 and 2016 may include relational databases, such as databases provided by Oracle, that are adapted to store, update, and retrieve data in response to SQL-formatted commands.

FIG. 21 illustrates an exemplary computer system 2100 that may be used to implement an embodiment of the present invention. In some embodiments, computer system 2100 may be used to implement any of the various servers and computer systems described above. As shown in FIG. 21, computer system 2100 includes various subsystems including a processing subsystem 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 may include tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2104 controls the operation of computer system 2100 and may comprise one or more processing units 2132, 2134, etc. A processing unit may include be one or more processors, including single core or multicore processors, one or more cores of processors, or combinations thereof. In some embodiments, processing subsystem 2104 can include one or more special purpose co-processors such as graphics processors, digital signal processors (DSPs), or the like. In some embodiments, some or all of the processing units of processing subsystem 2104 can be implemented using customized circuits, such as application specific integrated circuits (ASICs), or field programmable gate arrays (FPGAs).

In some embodiments, the processing units in processing subsystem 2104 can execute instructions stored in system memory 2110 or on computer readable storage media 2122. In various embodiments, the processing units can execute a variety of programs or code instructions and can maintain multiple concurrently executing programs or processes. At any given time, some or all of the program code to be executed can be resident in system memory 2110 and/or on computer-readable storage media 2110 including potentially on one or more storage devices. Through suitable programming, processing subsystem 2104 can provide various functionalities described above for dynamically modifying documents (e.g., webpages) responsive to usage patterns.

In certain embodiments, a processing acceleration unit 2106 may be provided for performing customized processing or for off-loading some of the processing performed by processing subsystem 2104 so as to accelerate the overall processing performed by computer system 2100.

I/O subsystem 2108 may include devices and mechanisms for inputting information to computer system 2100 and/or for outputting information from or via computer system 2100. In general, use of the term "input device" is intended to include all possible types of devices and mechanisms for inputting information to computer system 2100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2118 provides a repository or data store for storing information that is used by computer system 2100. Storage subsystem 2118 provides a tangible non-transitory computer-readable storage medium for storing the basic programming and data constructs that provide the functionality of some embodiments. Software (programs, code modules, instructions) that when executed by processing subsystem 2104 provide the functionality described above may be stored in storage subsystem 2118. The software may be executed by one or more processing units of processing subsystem 2104. Storage subsystem 2118 may also provide a repository for storing data used in accordance with the present invention.

Storage subsystem 2118 may include one or more non-transitory memory devices, including volatile and non-volatile memory devices. As shown in FIG. 21, storage subsystem 2118 includes a system memory 2110 and a computer-readable storage media 2122. System memory 2110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2100, such as during start-up, may typically be stored in the ROM. The RAM typically contains data and/or program modules that are presently being operated and executed by processing subsystem 2104. In some implementations, system memory 2110 may include multiple different types of memory, such as static random access memory (SRAM) or dynamic random access memory (DRAM).

By way of example, and not limitation, as depicted in FIG. 21, system memory 2110 may store application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2122 may store programming and data constructs that provide the functionality of some embodiments. Software (programs, code modules, instructions) that when executed by processing subsystem 2104 a processor provide the functionality described above may be stored in storage subsystem 2118. By way of example, computer-readable storage media 2122 may include non-volatile memory such as a hard disk drive, a magnetic disk drive, an optical disk drive such as a CD ROM, DVD, a Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2122 may provide storage of computer-readable instructions, data structures, program modules, and other data for computer system 2100.

In certain embodiments, storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for storing computer-readable information.

In certain embodiments, computer system 2100 may provide support for executing one or more virtual machines. Computer system 2100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2100. Accordingly, multiple operating systems may potentially be run concurrently by computer system 2100. Each virtual machine generally runs independently of the other virtual machines.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to establish a communication channel to one or more client devices via the Internet for receiving and sending information from and to the client devices. Additionally, communication subsystem 2124 may be used to communicate notifications of successful logins or notifications to re-enter a password from the privileged account manager to the requesting users.

Communication subsystem 2124 may support both wired and/or wireless communication protocols. For example, in certain embodiments, communications subsystem 2124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

Communication subsystem 2124 can receive and transmit data in various forms. For example, in some embodiments, communications subsystem 2124 may receive input communication in the form of structured and/or unstructured data feeds 2126, event streams 2128, event updates 2130, and the like. For example, communications subsystem 2124 may be configured to receive (or send) data feeds 2126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2124 may be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2100 depicted in FIG. 21 is intended only as a specific example. Many other configurations having more or fewer components than the system depicted in FIG. 21 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    displaying a first visualization, wherein the first visualization comprises a graphical representation of first data from a database, the graphical representation of the first data is a first graph, and the first data is in a first visualization table;
    displaying a second visualization, wherein the second visualization comprises a graphical representation of second data from the database, the graphical representation of the second data is a second graph, and the second data is in a second visualization table different from the first visualization table;
    receiving input indicative of selection of a first portion of the first visualization;
    in response to receiving the input:
        determining a first dimension member belonging to a first dimension of the database, the first dimension represented in the first visualization, the first dimension member corresponding to the first portion;
        identifying a correlation table that includes the first dimension member; and
        determining, using the correlation table, a second dimension member that is correlated to the first dimension member, the second dimension member belonging to a second dimension that is different from the first dimension;
    in response to determining the second dimension member, identifying one or more rows in the second visualization table that include the second dimension member; and
    highlighting a first portion of the second visualization corresponding to the second dimension member using the identified one or more rows in the second visualization table.

2. The method of claim 1, further comprising:
    prior to displaying the first visualization, receiving a request to create the first visualization, the request comprising at least the first dimension of the first visualization;
    in response to the request, obtaining the first data corresponding to the first visualization from the database; and
    generating the first visualization based at least in part on the first data.

3. The method of claim 2, wherein generating the first visualization further comprises constructing the correlation table, wherein the correlation table comprises at least the first data corresponding to the first visualization.

4. The method of claim 1, wherein the first graph or the second graph comprises at least one of a bar chart, a line chart, a combination chart, a pie chart, a scatterplot, a map chart, a treemap, a heat map, a parallel coordinate plot, a box plot, and a user created or a customizable chart.

5. The method of claim 1, wherein determining the second dimension member that is correlated to the first dimension member comprises:
    identifying the correlation table from a set of one or more correlation tables that comprises at least the first dimension member of the first visualization;
    marking a set of one or more rows of the correlation table that include at least the first dimension member; and
    determining the second dimension that is correlated to the first dimension member based at least in part on the marked set of one or more rows.

6. The method of claim 1, wherein highlighting the first portion of the second visualization corresponding to the second dimension member comprises:
    identifying a set of one or more visualization tables corresponding to one or more visualizations that include at least the first dimension member and the second dimension member, wherein the one or more visualization tables comprise at least the second visualization table;
    marking a set of one or more rows of the identified set of one or more visualization tables that include at least the first dimension member and the second dimension member; and
    identifying one or more portions of the one or more visualizations that correspond to the marked set of one or more rows, wherein the one or more visualizations comprise at least the second visualization.

7. The method of claim 6, wherein the one or more portions that correspond to the marked set of one or more rows are in a plurality of visualizations other than the first visualization and highlighting the first portion of the second visualization corresponding to the second dimension member further comprises highlighting the one or more portions of the one or more visualizations that correspond to the marked set of one or more rows.

8. The method of claim 1, further comprising receiving input indicative of selection of more than one portion of the first visualization.

9. The method of claim 1, further comprising displaying a third visualization, the third visualization comprising a graphical representation of third data.

10. The method of claim 9, further comprising:
prior to displaying the third visualization, receiving a request to create the third visualization;
in response to the request, obtaining third data corresponding to the third visualization; and
generating the third visualization based at least in part on the obtained third data.

11. The method of claim 10, further comprising constructing at least a first correlation table and a second correlation table, wherein the first correlation table comprises at least the first data corresponding to the first visualization and the second data corresponding to the second visualization.

12. The method of claim 11, wherein the second correlation table comprises at least one of the first data corresponding to the first visualization and the third data corresponding to the second visualization or the second data corresponding to the second visualization and the third data corresponding to the third visualization.

13. The method of claim 11, wherein the second correlation table or a third correlation table is constructed in response to receiving the request to create the second visualization or the third visualization.

14. The method of claim 1, further comprising displaying the first visualization, the second visualization and the highlighted first portion of the second visualization via a graphical user interface of a client device.

15. A system comprising:
one or more processors; and
a memory coupled with and readable by the one or more processors, the memory configured to store a set of instructions which, when executed by the one or more processors, causes the one or more processors to:
display a first visualization, wherein the first visualization comprises a graphical representation of first data from a database, the graphical representation of the first data is a first graph, and the first data is in a first visualization table;
display a second visualization, wherein the second visualization comprises a graphical representation of second data from the database, the graphical representation of the second data is a second graph, and the second data is in a second visualization table different from the first visualization table;
receive input indicative of selection of a first portion of the first visualization;
in response to receiving the input:
determine a first dimension member belonging to a first dimension of the database, the first dimension represented in the first visualization, the first dimension member corresponding to the first portion;
identify a correlation table that includes the first dimension member; and
determine, using the correlation table, a second dimension member that is correlated to the first dimension member, the second dimension member belonging to a second dimension that is different from the first dimension;
in response to determining the second dimension member, identify one or more rows in the second visualization table that include the second dimension member; and
highlight a first portion of the second visualization corresponding to the second dimension member using the identified one or more rows in the second visualization table.

16. The system of claim 15, wherein the one or more processors is further configured to:
receive a request to create the first visualization, the request comprising at least the first dimension of the first visualization;
in response to the request, obtain the first data corresponding to the first visualization from the database; and
generate the first visualization based at least in part on the first data.

17. The system of claim 15, wherein the one or more processors is further configured to construct the correlation table, wherein the correlation table comprises at least the first data corresponding to the first visualization and the second data corresponding to the second visualization.

18. A non-transitory computer-readable storage memory storing a plurality of instructions executable by one or more processors, the plurality of instructions comprising:
instructions that cause the one or more processors to display a first visualization, wherein the first visualization comprises a graphical representation of first data from a database, the graphical representation of the first data is a first graph, and the first data is in a first visualization table;
instructions that cause the one or more processors to display a second visualization, wherein the second visualization comprises a graphical representation of second data from the database, the graphical representation of the second data is a second graph, and the second data is in a second visualization table different from the first visualization table;
instructions that cause the one or more processors to receive input indicative of selection of a first portion of the first visualization;
instructions that cause the one or more processors, in response to receiving the input, to:
determine a first dimension member belonging to a first dimension of the database, the first dimension represented in the first visualization, the first dimension member corresponding to the first portion;
identify a correlation table that includes the first dimension member; and
determine, using the correlation table, a second dimension member that is correlated to the first dimension member, the second dimension member belonging to a second dimension that is different from the first dimension;
instructions that cause the one or more processors to, in response to determining the second dimension member, identify one or more rows in the second visualization table that include the second dimension member; and
instructions that cause the one or more processors to highlight a first portion of the second visualization corresponding to the second dimension member using the identified one or more rows in the second visualization table.

19. The non-transitory computer-readable storage memory of claim 18, wherein instructions that cause the one or more processors to determine the second dimension member that is correlated to the first dimension member comprises instructions to:
- identify the correlation table from a set of one or more correlation tables that comprises at least the first dimension member of the first visualization;
- mark a set of one or more rows of the correlation table that include at least the first dimension member; and
- determine the second dimension that is correlated to the first dimension member based at least in part on the marked set of one or more rows.

20. The non-transitory computer-readable storage memory of claim 18, wherein instructions that cause the one or more processors to highlight the first portion of the second visualization corresponding to the second dimension member further comprises instructions to:
- identify a set of one or more visualization tables corresponding to one or more visualizations that include at least the first dimension member and the second dimension member, wherein the one or more visualization tables comprise at least the second visualization table;
- mark a set of one or more rows of the identified set of one or more visualization tables that include at least the first dimension member and the second dimension member; and
- identify one or more portions of the one or more visualizations that correspond to the marked set of one or more rows, the one or more visualizations comprising at least the second visualization.

* * * * *